United States Patent
Kruger

(10) Patent No.: US 11,983,658 B1
(45) Date of Patent: May 14, 2024

(54) EXECUTION OF MACHINES BASED ON PERFORMANCE DATA

(71) Applicant: Starbucks Corporation, Seattle, WA (US)

(72) Inventor: Joshua J. Kruger, Seattle, WA (US)

(73) Assignee: Starbucks Corporation, Seattle, WA (US)

(*) Notice: Subject to any disclaimer, the term of this patent is extended or adjusted under 35 U.S.C. 154(b) by 0 days.

(21) Appl. No.: 18/348,998

(22) Filed: Jul. 7, 2023

Related U.S. Application Data

(63) Continuation-in-part of application No. 18/160,046, filed on Jan. 26, 2023.

(51) Int. Cl.
*G06Q 10/08* (2023.01)
*G06K 7/10* (2006.01)
*G06Q 10/0639* (2023.01)

(52) U.S. Cl.
CPC ......... *G06Q 10/08* (2013.01); *G06K 7/10861* (2013.01); *G06Q 10/0639* (2013.01)

(58) Field of Classification Search
None
See application file for complete search history.

(56) References Cited

U.S. PATENT DOCUMENTS

| | | | |
|---|---|---|---|
| 6,547,137 B1* | 4/2003 | Begelfer | G06Q 10/08 235/380 |
| 2009/0230190 A1* | 9/2009 | Chanez | G06Q 10/08 235/385 |
| 2011/0154046 A1* | 6/2011 | Fradet | H04L 9/3247 713/179 |
| 2017/0061350 A1* | 3/2017 | Smith | G06Q 10/06315 |
| 2019/0210806 A1* | 7/2019 | Aida | G06Q 50/28 |

* cited by examiner

*Primary Examiner* — Suezu Ellis
(74) *Attorney, Agent, or Firm* — Knobbe, Martens, Olson & Bear, LLP

(57) ABSTRACT

A system and method for tracking physical environment performance may include a label printer configured to print labels comprising a machine readable code, wherein the machine readable code contains item information associated with an item. The system may include production channels and scanners associated with the production channels; the scanner located at a first physical location of the physical environment and configured to scan the machine readable code. The system may obtain input data indicative of the production of the item and may determine performance data based on the input data. The system may cause implementation and/or execution of machines based on the performance data.

20 Claims, 12 Drawing Sheets

EXECUTION OF MACHINES BASED ON PERFORMANCE DATA

RELATED APPLICATIONS

This application is a continuation-in-part of U.S. patent application Ser. No. 18/160,046, filed Jan. 26, 2023, entitled "SYSTEMS, METHODS, AND DEVICES FOR LOCATION-BASED PRODUCTION OPTIMIZATION," the entire contents of which is hereby incorporated by reference herein.

FIELD

This present disclosure relates to systems, methods, and devices for execution of machines based on performance data, such as, in certain embodiments, systems and methods for determining and implementing an order schedule, a layout of a physical environment, and/or a worker schedule based at least in part on locations of work centers and distribution points.

BACKGROUND

Beverages may be prepared using different preparation methodologies or processes.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Figure 1A:
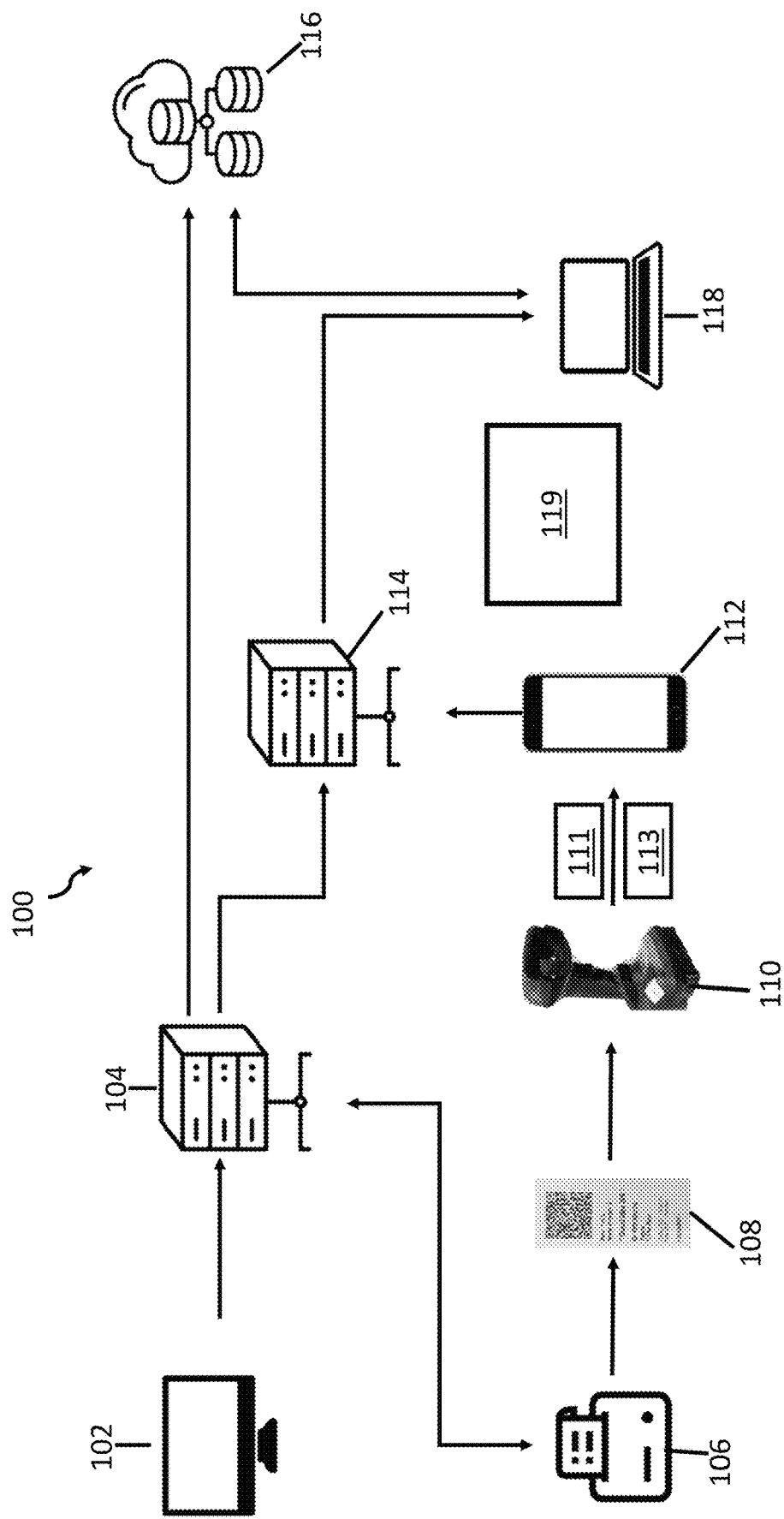
FIGS. 1A, 1B, and 1C illustrates various embodiments of systems for implementing location-based production optimization.

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

At high throughput production facilities, such as nationwide cafés or coffee retailers, small changes in the manner in which objects (e.g., item(s), device(s), article(s), physical component(s), etc.) are prepared can significantly improve efficiency and throughput. For example, the manner in which item(s) are prepared can include the order in which the item(s) are prepared, the work center(s) used to prepare the item(s), the distribution point(s) used to distribute the item(s), the distances between work center(s) associated with the item(s), the distance(s) between the work centers and distribution point(s) associated with the item(s), different throughput stream(s), the worker(s) assigned to prepare the item(s) (e.g., automated or human workers), etc. A change in throughput, in turn, can increase the efficiency of the systems and decrease wait times for users. For example, the change in throughput can modify the efficiency in which orders are prepared and delivered. The change in throughput can also modify item pricing and worker scheduling, among other considerations. While the present disclosure references items, the system, methods, and devices herein described may be implemented with respect to any objects.

Systems may modify the manner in which products are prepared based on outputs from production tracking systems. However, current production tracking systems require workers to manually indicate when production of an item and/or an order is complete. Manual indication is unreliable and is usually done by workers for an incomplete percent of items/orders making it difficult to determine accurate production times and production efficiency. Additionally, production tracking systems do not account for distances between work centers and distribution points or different throughput streams. Without accurate production times and additional production information, it can be difficult to determine which factors (e.g., a layout of a physical environment, worker schedule, etc.) affect production time, production efficiency, or throughput.

Additionally, as the manners in which workers or systems determine and track production of an item and/or completion of an order may be diverse and large in number, traditional systems utilizing manual determinations may be unable to manually identify particular factors to modify in an efficient manner to improve the efficiency of the production of an item and/or completion of an order. Further, it would be inefficient and time consuming for the system to manually compare multiple sets of production time for each item and/or order and/or for the system to make determinations based on items and/or orders associated with a particular worker (e.g., a robot). Additionally, when the manual process is completed, the factors may have changed such that the production data may no longer be relevant. Therefore, such traditional systems may lead to inaccuracies. Further, the use of such traditional systems can increase memory demands and processing usage by computing devices due to the iterative process.

Typically, such traditional systems may be unable to dynamically analyze production channels to determine production data associated with the production channels and determine performance data for machines associated with machines of the production channels. Further, such traditional systems may be unable to instruct a machine to execute an operation to perform an operation based on the performance data.

In accordance with several embodiments, the systems described herein advantageously can be used to determine production times of items and/or orders in a consistent, accurate manner. The systems can include scanners, RFID tags, and/or any other sensors to track production of items and/or orders from when a user places an order to when the items and/or order are placed at a distribution point. Therefore, the systems can normalize how the production of the items and/or the orders is determined and monitored such that accurate performance data can be determined. In some cases, the system can provide input data generated by machines of a production channel to a machine learning model to determine performance data. The systems may utilize the performance data to determine how to instruct machines to execute operations (e.g., instruct other machines to perform other operations (e.g., complete other orders), the same machine to complete other orders, generate and/or provide a schedule or layout, etc.).

The systems can use scanners, RFID tags, and/or any other sensors to determine (e.g., monitor, track, etc.) or identify locations of workers throughout the production of items and/or orders. The systems can use locations of various scanners or other input/tracking devices placed at distribution points and/or work centers used to produce items as input data for determining performance data (e.g., production efficiency and/or optimization of production efficiency). By utilizing the systems in such a manner, the efficiency (e.g., computing system efficiency), throughput, etc. may be improved.

FIG. 1A shows a system 100 for implementing location-based production optimization. The system 100 may include a point-of-sale system 102, a controller 104 (referred to herein as production controller 104), a label 108, one or more physical hardware devices (e.g., one or more printers 106 (which can also be referred to herein as "label printers" when configured to print a label), one or more scanners 110, etc.), a router 112, a data processor 114, a data analysis platform 116 and/or a user device 118. For example, the system may include a first hardware device (e.g., printer 106), a second hardware device (e.g., a first scanner 110), and a third hardware device (e.g., a second scanner 110). Each of the one or more hardware devices may be located at a particular location within a physical environment. The point-of-sale system 102 may receive object data (e.g. orders, requests, queries, etc. indicating one or more objects), calculate a price or cost of orders, receive payments and/or any other common functions of a point-of-sale system. The point-of-sale system 102 may receive the object data from computing devices. In some cases, the object data may include order data and the point-of-sale system 102 may receive an order by receiving order data indicative of the order and/or may generate order data indicative of the order. The point-of-sale system 102 may transmit the object data (e.g., orders, the order data, and/or any information related to the orders) to the production controller 104. While the present disclosure references orders, the system, methods, and devices herein described may be implemented with respect to object data.

The production controller 104 may receive the object data. The production controller 104 may schedule or sequence orders. The production controller 104 may use artificial intelligence (AI) and/or machine learning (ML) to determine performance data (e.g., an order schedule (e.g., an order sequence), a layout, machine analytics, item production analytics, etc.) based on the input data. For example, the production controller 104 may determine an optimized order schedule based on the input data. For example, the production controller 104 may train a machine learning model using training data (e.g., one or more orders, input data, and an optimized order schedule) to output performance data indicative of an order schedule based on the orders and the input data. In some embodiments, the machine learning model may output performance data and the production controller 104 may generate an order schedule based on the performance data. In certain embodiments, the input data may include and/or may be indicative of a physical layout of a physical environment (e.g., a physical layout of machines within a physical environment), a machine status, a location of a physical environment, an order history, a historic efficiency, a current efficiency, a worker schedule, worker efficiency, item production time history, order production time history, a current date/time, a current schedule of orders, a current production stage of each item of current orders, an order origin, a distribution point, a distribution point location, and/or any other information described herein. In certain embodiments, the input data may include any data calculated by the data processor 114 and/or the data analysis platform 116. In certain embodiments, the input data may include any analysis performed by the data processor 114 and/or the data analysis platform 116.

In certain embodiments, the production controller 104 may transmit order data (e.g., orders and/or the optimized order schedule) to the printer 106, the data processor 114, and/or the data analysis platform 116. The production controller 104 can transmit the orders and/or the order schedule to the data processor 114 and/or the data analysis platform 116 via a Webhook, an application programming interface (API), and/or any other system for transmitting data or information between devices. In certain embodiments, the data processor 114 and/or the data analysis platform 116 may retrieve the orders and/or the order schedule from the production controller 104. The data processor 114 and/or the data analysis platform 116 may retrieve the orders and/or the order schedule from the production controller 104 via a Webhook, an application programming interface (API), and/or any other system for transmitting data or information between devices.

Based on the order schedule, the production controller 104 may transmit instructions to the printer 106 to print a label 108. The printer 106 may physically output (e.g., print, display, cause display of, etc.) a label 108 based on the order data. For example, the printer 106 may print a label 108 for each order and/or each item in an order based on the order data. For example, the instructions may cause the printer 106 to print the label 108. The printer 106 may transmit to the production controller 104 and/or the data processor 114 first time data indicative of a time/date of when a label 108 is printed by the printer 106. For example, the printer 106 may transmit first time data indicative of an output time (e.g., a printing time) of the label by the printer 106. In certain embodiments, the production controller 104 may use the orders and/or the order schedule to automatically determine when to cause the printer 106 to print a label 108 for each order or each item in an order. For example, the production controller 104 may schedule instructions to be sent to the printer 106 such that the printer receives different subsets of the instructions at different time periods and prints a corresponding label at each time period. In another example, the instructions may cause the printer 106 to print different subsets of the instructions at different time periods. In certain embodiments, the production controller 104 may instruct the printer 106 to print a label 108 for each item in a first order before printing a label 108 for a second order.

In certain embodiments, the printer 106 may print item information 108C, a first machine readable code 108A, a second machine readable code 108B, and/or any other information on an item container 109. In some embodiments, the printer 106 may transmit object data (e.g., item data, item information 108C, information contained in the first machine readable code 108A, information contained in the second machine readable code 108B, and/or any other information) to a processor or a memory embedded in the item container 109 and/or a worker computing device. For example, the worker computing device may be a computing device of a robot, a computing device of a human, etc. The printer 106 may transmit the information to the processor via Bluetooth, NFC, Wi-Fi, ZigBee, infrared, and/or any other communication protocol.

Figure 1B:
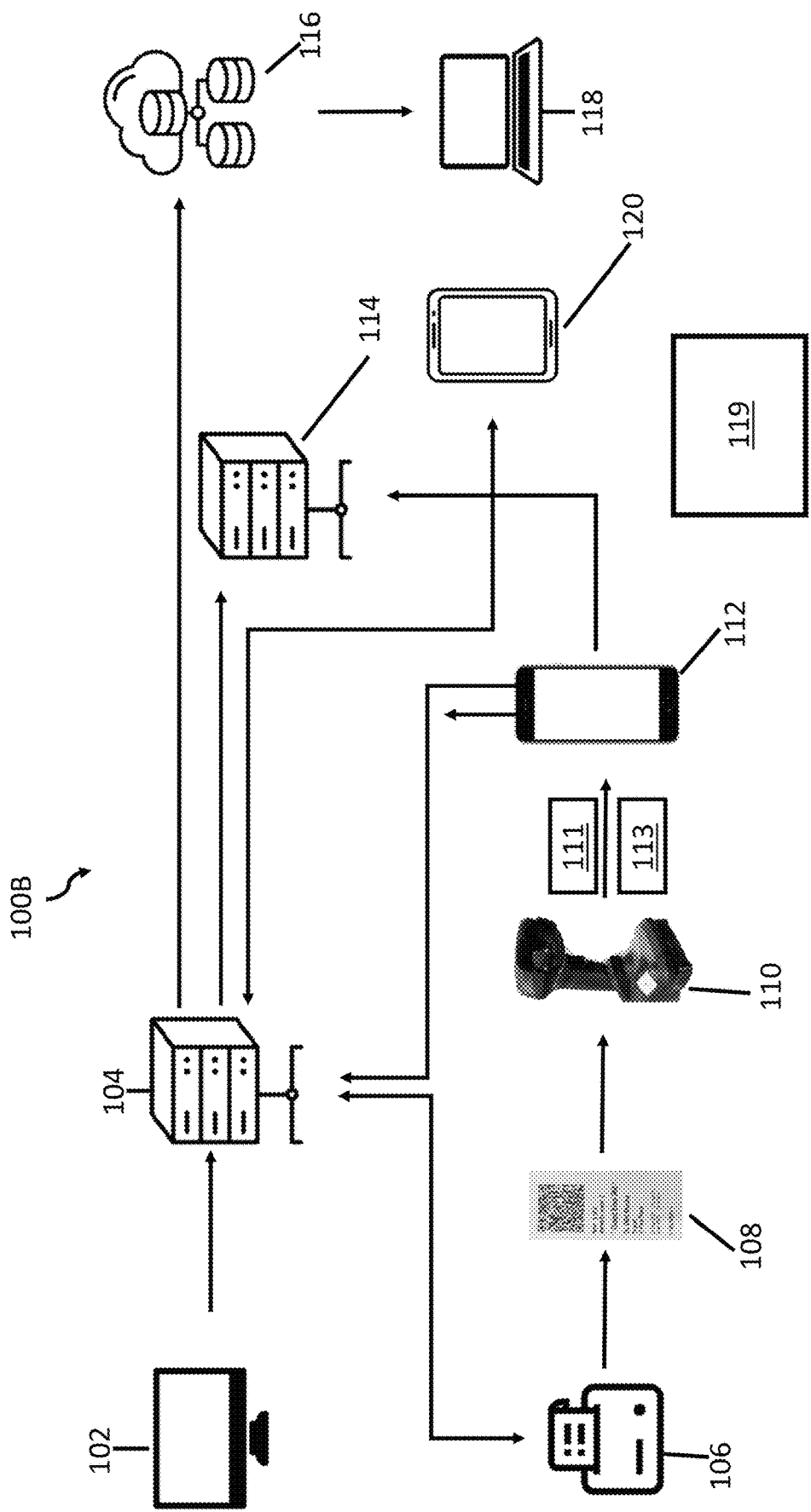
Figure 1C:
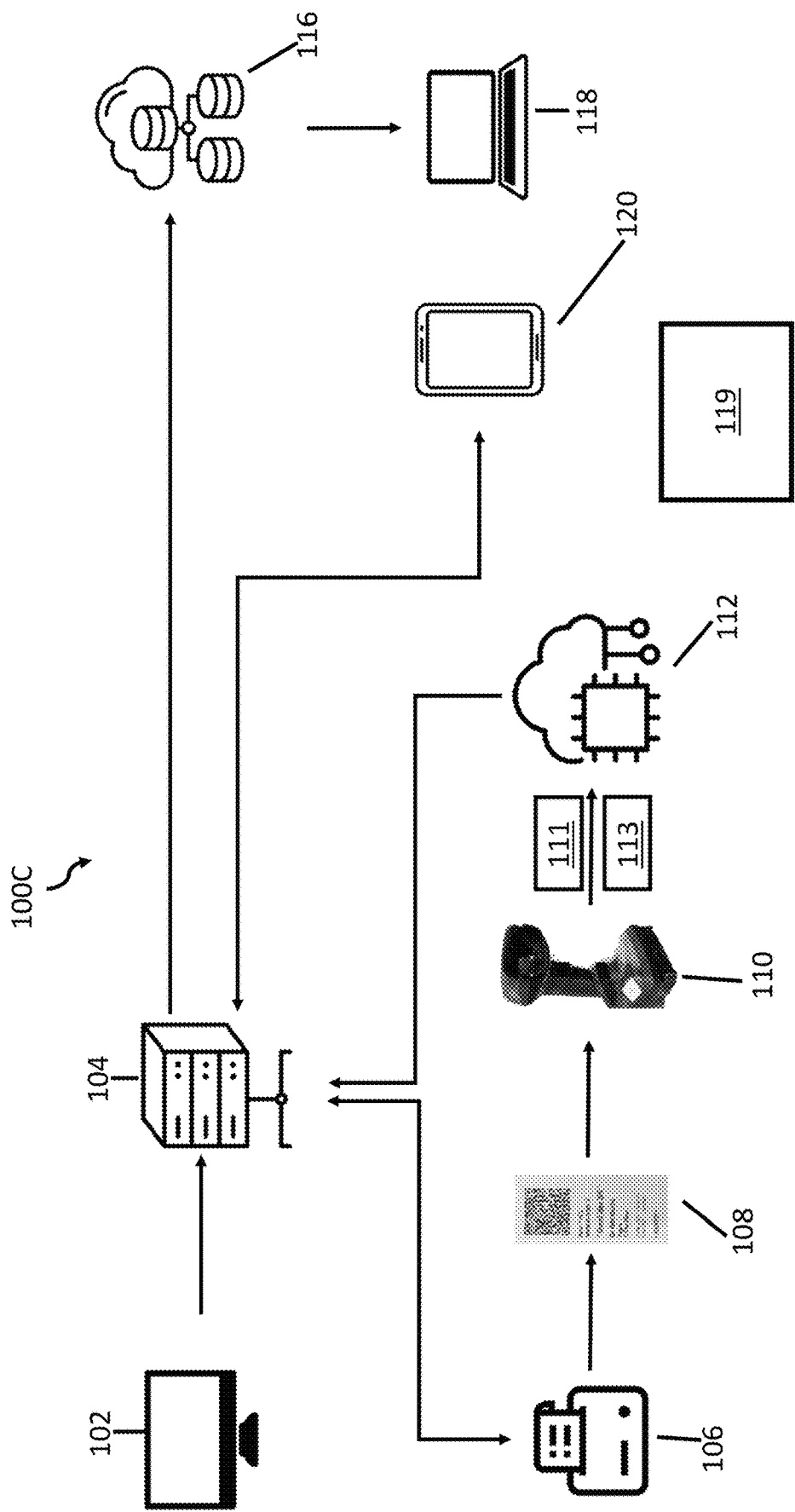
Figure 1D:
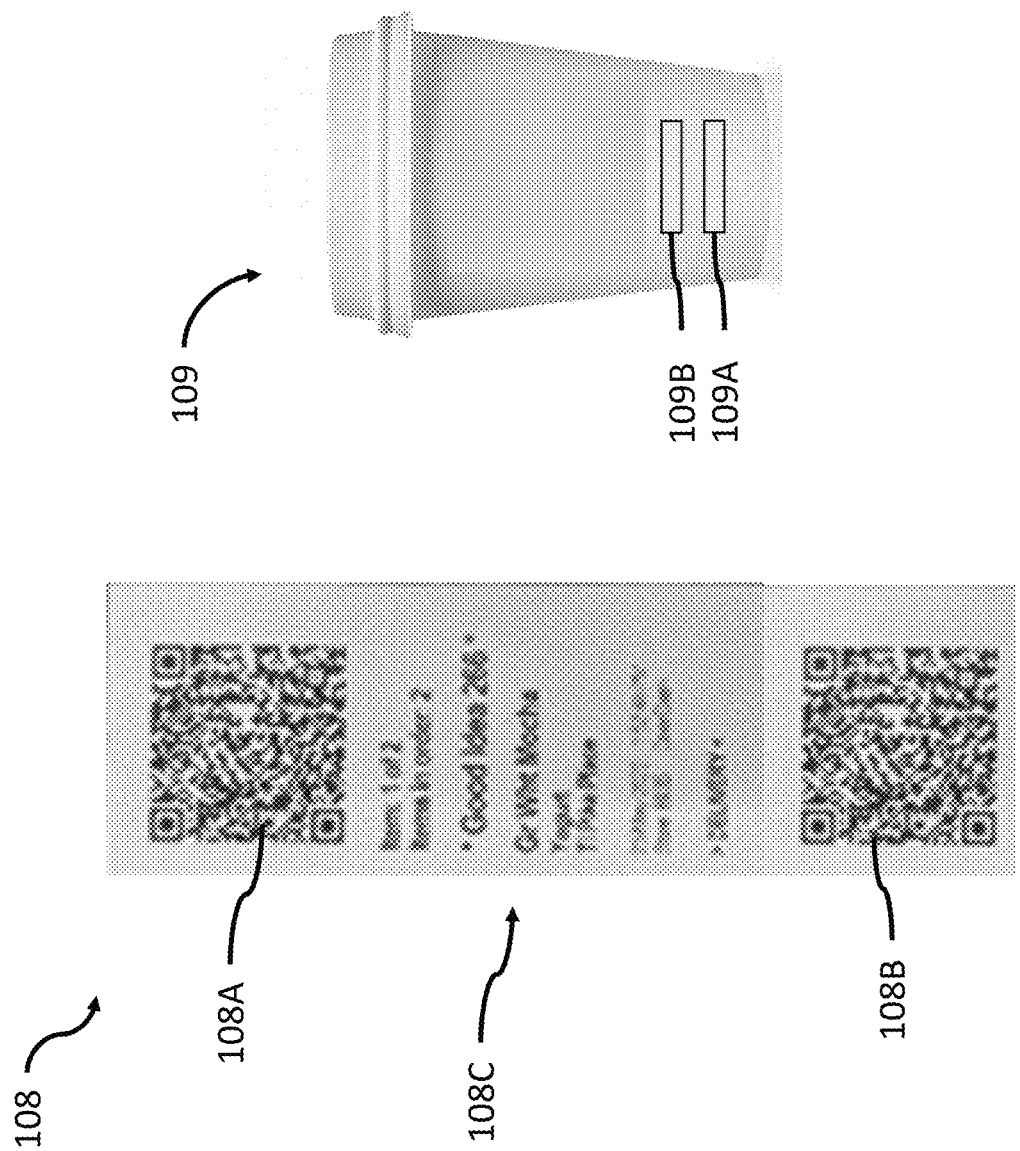
FIG. 1D illustrates an embodiment of a label and an item container of the systems for implementing location-based production optimization of FIGS. 1A-1C.

The label 108, may include a first machine readable code 108A as depicted in FIG. 1D. The first machine readable code 108A may be a barcode, a QR code, and/or any other machine-readable optical label and/or other machine-readable codes, such as, for example, physical patterns, magnetic strips, radio-frequency identification (RFID), or electrical circuits. In certain embodiments, the label 108 may include a second machine readable code 108B as depicted in FIG. 1D. The second machine readable code 108B may be a barcode, a QR code, and/or any other machine-readable optical label and/or other machine-readable codes. The first machine readable code 108A and second machine readable code 108B may be scanned or read by a computing device. For example, the second machine readable code 108B may be scanned or read by a user via a user computing device. The second machine readable code 108B may automatically direct or redirect a user to a survey, order information (e.g., a time of order, time to complete order, location of a physical environment, pick-up time of order, etc.), user rewards, and/or any other information related to the user, the item, or the order. The survey, order information, user rewards, and/or other information related to the user, the item, or the order may be customized based on the user or a user profile associated with the item or the order.

The label 108 may include item information 108C as depicted in FIG. 1D. The item information 108C may include a number of items in an order associated with the label 108, an item number, an order number, an order name, an item identifier, components of the item, an order date and/or time, a store number, an order origin, and/or an order fulfillment method. The item identifier may be a Stock Keeping Unit (SKU) associated with the item, an item name, an abbreviated item name, and/or any other item identifier. The order origin may indicate where the point-of-sale system 102 received the order from a computing device (e.g., via an application (e.g., a third-party application), a website, etc.). The order fulfillment method may indicate a distribution point or how the order will be delivered to or picked up by a user (i.e., delivery, pick up, counter pick up, etc.). The first machine readable code 108A and/or the second machine readable code 108B may contain all or a portion of the item information 108C.

The first machine readable code 108A may be optically scanned or read by the scanner 110 (e.g., actively or passively). In certain embodiments, the system 100 can include a plurality of scanners 110. All or a portion of the plurality of scanners 110 may include one or more image sensors to optically scan or read the first machine readable code 108A. The system 100 can include 1, 2, 3, 4, 5, 6, 7, 8, 9, 10, and/or any other number of scanners 110 including more than 10 scanners. In certain embodiments, the system 100 can include between 1 and 10 scanners 110. In certain embodiments, the system 100 can include between 2 and 9 scanners 110. In certain embodiments, the system 100 can include between 3 and 8 scanners 110. In certain embodiments, the system 100 can include between 4 and 7 scanners 110. In certain embodiments, the system 100 can include more than 10 scanners 110.

The scanner 110 may be associated with a location of a physical environment where the scanner 110 is physically located. The location may be at the point-of-sale system 102, a register, a work center, the printer 106, a pick-up counter, a drive through window or counter, an online order pick-up counter, a delivery pick-up counter, any other distribution point, and/or a point along the production line of order. In certain embodiments, the location of the scanner 110 may be a GPS location of the scanner 110.

A user and/or a worker can place the label 108 on a corresponding item container 109 as depicted in FIG. 1D. The item container 109 may be a cup, beverage holder, food packaging, and/or any other item container 109. In certain embodiments, the printer 106 may print the label 108 and the printer 106, or a separate component of the system 100 (e.g., a robotic device), may automatically place the label 108 on the corresponding item container 109.

In certain embodiments, the item container 109 may include container identification information 109A as depicted in FIG. 1D. In certain embodiments, the container identification information 109A may include a machine readable code. The user and/or the worker may use the scanner 110 to associate the label 108 and/or the item information 108C with the container identification information 109A. In these embodiments, instead of scanning the label 108 as described herein, the user and/or the worker may scan the container identification information 109A. Based on scanning one or more of at least a portion of the label 108 and/or the container identification information 109A, the scanner 110 may associate the at least a portion of the label 108 and the container identification information 109A. The scanner 110 may generate association information linking the at least a portion of the label 108 and the container identification information 109A and may store the association information in a local or remote data store. In some embodiments, the scanner 110, or a separate component of the system 100, may generate the association information and store the association information in a data store accessible by all or a portion of the components of the system 100.

In certain embodiments, the user and/or the worker may place the first machine readable code 108A of a label 108 in front of the scanner 110 so the scanner 110 can scan or read the first machine readable code 108A when the user and/or the worker completes production of the item associated with the label 108. In some embodiments, the system 100 may include a robotic device. The system 100 may cause the robotic device to move the first machine readable code 108A in front of the scanner 110.

When the scanner 110 scans or reads the first machine readable code 108A of a label 108, the scanner 110 can obtain and/or generate production data 111 based on the first machine readable code 108A. In some embodiments, the scanner 110 may route data corresponding to the first machine readable code 108A to a computing device, and the computing device may generate the production data. The production data 111 may include an indication that the scanner 110 scanned or read the first machine readable code 108A, an indication that production of the item associated with label 108 is complete, time data indicative of a date/time when the scanner 110 scanned or read the first machine readable code 108A (e.g., a scanning time, a scan time), and/or an indication of the user or robotic device that placed the first machine readable code 108A in front of the scanner 110 (i.e., the user or worker that produced or made the item). In certain embodiments, if the item is the only item in an order and/or a last item (e.g., production of all other items in an order is complete or first machine readable codes 108A of labels 108 of all other items in the order have previously been scanned) in the order, the production data 111 may include an indication that production of the order is complete.

The scanner 110, or a separate component of the system 100, may transmit the production data 111 to the data router 112. In certain arrangements, the scanner 110 automatically transmits production data 111 to the data router 112 (e.g., in response to scanning or reading the first machine readable code 108A).

The data router 112 may receive the production data 111 from the scanner 110. In certain embodiments, the data router 112 may be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, a bare metal computer system, a bare machine, and the like. In certain embodiments, the data router 112 may be an internet of things (IoT) data router or a server. In certain embodiments, the data router 112 may be part of or embedded in the scanner 110.

In certain embodiments, the data router 112, or a separate component, may generate the production data 111 based on data obtained from a communication device (e.g., an RFID tag 109B depicted in FIG. 1D) coupled to or embedded in an item container 109. For example, the data router 112 may generate the production data 111 based on data obtained from the communication device in addition or instead of receiving the production data 111 from the scanner 110. In these embodiments, the data obtained from the communication device can include an identifier of the item container 109, the item, and/or the order. The data router may generate production data 111 identifying a location of the item container 109, a stage of production of the item associated with the item container 109, a date/time when each stage of production was completed, and/or any other information associated with the production of the item based on the data obtained from the communication device. The communication device may transmit the data to the data router 112 in real time, or the RFID tag 109B can transmit the data to the data router 112 when production of the item is complete. For example, an RFID reader may read an RFID tag 109B and transmit data identifying the RFID tag, the corresponding item container 109, the item, and/or the order to the data router 112. In some embodiments, the data router 112, or a separate component, may receive the production data 111 from a communication device.

In certain embodiments, the scanner 110 may transmit a hardware device identifier 113 (referred to herein as scanner identifier 113) (e.g., a numerical, alphabetical, alphanumerical, symbolical, etc. identifier) to the data router 112. For example, the scanner 110 may transmit a scanner identifier 113 with the production data 111 to the data router 112 or separate from the transmission of the production data 111 to the data router 112. In certain embodiments, the data router 112 may include a local or remote data store (e.g., memory) configured to store scanner identifiers 113 associated with all or a portion of the scanners 110 in the system 100. For example, a computing device may upload the scanner identifiers 113 to the data store and/or may link particular scanner identifiers 113 to particular scanners within the data store (e.g., may link a scanner identifier to an address associated with the scanner). In certain embodiments, the scanner 110 may communicate with or be paired with the data router 112 via Bluetooth, NFC, Wi-Fi, ZigBee, infrared, and/or any other communication protocol. The scanner 110 may request or instruct the data router 112, a user, and/or a worker to assign the scanner 110 to a location in a physical environment (i.e., a work center, a distribution point, etc.).

In certain embodiments, the scanner 110 may include the scanner identifier 113 (e.g., printed or otherwise displayed on a portion of the scanner 110), and a user computing device may upload the scanner identifier 113 to the data store. In certain embodiments, the data router 112 may automatically determine which scanner 110 the data router 112 received the production data 111 from. The scanner identifier 113 may identify a model of the scanner 110, an IP address of the scanner 110, a scanner 110 number, a scanner 110 name and/or any other information associated with the scanner 110. In certain embodiments, the scanner identifier 113 may indicate or identify a location of the scanner 110. In certain embodiments, the scanner identifier 113 may be a numerical, alphabetical, or alpha-numeric string. The location of the scanner may be a GPS location and/or a known location of the scanner 110. For example, the scanner identifier 113 may identify GPS coordinates associated with the scanner 110. The scanner 110 may include a location sensor that provides location data identifying a location of the scanner 110, and the scanner 110 may include the location data within the scanner identifier 113.

In certain embodiments, a display 119 (e.g., of a computing device) may display the production data 111 and/or the scanner identifier 113 to the user. The scanner 110 and/or the data router 112 may provide instructions to a computing device that cause the computing device to display the production data 111 and/or the scanner identifier 113 via a display 119 of the computing device. In certain embodiments, the display may be part of the data router 112, and/or the user device 118. The display 119 may display the production data 111 and/or the scanner identifier 113 for each item and/or order to the user. The display 119 may display the production data 111 and/or the scanner identifier 113 for each item and/or order to the user based on when each item was scanned, when each order was completed, when each order was received and/or any other sequence.

The data router 112 may transmit the production data 111, scanner identifier 113 associated with the production data 111, the item information 108C, and/or any other data to the data processor 114. The data processor 114 may be a server, an array of servers, a cloud computing platform, and/or any other computing device. The data processor 114 may process and/or analyze any data or information received from the production controller 104, and/or the data router 112 to calculate any data and/or perform any of the analysis described herein. The data processor 114 may include a data store (e.g., memory). The data store may include a database of data or information received by the data processor 114, all or a portion of data calculated by the data processor 114, and/or all or a portion of analysis performed by the data processor 114. The data store or memory may be configured to store computer-executable instructions. The data store or memory may be in communication with at least one process configured to execute the computer-executable instructions.

A user device 118 may retrieve (e.g., download) data stored in the data store. The user device 118 may be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

In certain embodiments, the data stored in the database may include a file format. The file format may be comma-separate value file (.csv), data file (.dat), database file (.db or .dbf), log file (.log), Microsoft Access database file (.mdb), save file (.sav), SQL database file (.sql), tarball file archive (.tar), XML file (.xml), and/or any other file format.

The user device 118 may transmit the retrieved data to the data analysis platform 116. The data analysis platform 116 may be a server, an array of servers, a cloud computing platform, and/or any other computing device. The data analysis platform 116 may process and/or analyze data received from the user device 118, and/or the production controller 104 to calculate any data and/or perform any of the analysis or operations described herein. The data analysis platform 116 may include a data store (e.g., memory). The data store may include a database of data or information received by the data analysis platform 116, all or a portion of data calculated by the data analysis platform 116, and/or all or a portion of the results of the analysis performed by the data analysis platform 116.

FIG. 1B shows another system 100B for implementing location-based production optimization. Common features between the system 100B for implementing location-based production optimization and the system 100 for implementing location-based production optimization will not be described again but are incorporated here in their entirety.

The system 100B may include a distribution point device 120. The distribution point device 120 may be a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The distribution point device 120 may transmit data to the production controller 104 and/or receive data from the production controller 104. The distribution point device 120B can receive orders and/or the order schedule from the production controller 104. The distribution point device 120 may receive the production data 111, the item information 108C, all or a portion of the data calculated by the data processor 114 and/or the data analysis platform 116, and/or all or a portion of the results of the analysis performed by the data analysis platform 116.

In certain embodiments, the display 119 may be part of the distribution point device 120. The distribution point device 120 may cause display, via the display 119, of one or more of the orders, the order schedule, the production data 111, the item information 108C, all or a portion of data calculated by the data processor 114 and/or the data analysis platform 116, and/or all or a portion of the results of the analysis performed by the data analysis platform 116. In certain embodiments, the distribution point device 120 may cause display, via the display 119, of data associated with at least one of the orders. For example, the data may identify a date/time when an order was received by the point-of-sale system 102, a date/time when the printer 106 printed a label 108 associated with the order and/or an item of the order, a current stage of the order and/or each item of the order, an estimated production completion time of the order and/or each item of the order, a date/time when production of each item and/or order was completed, the worker that produced or completed production of each item and/or order, the location of the scanner 110 that scanned the first machine readable code 108A of the label 108 associated with each item of the order, and/or any other data or information described herein.

In certain embodiments, a user may edit or update orders and/or the order schedule via the distribution point device 120. In certain embodiments, the user, via the distribution point device 120, may edit or update any data displayed by the distribution point device 120. For example, if production of an item and/or an order is complete, but the distribution point device 120 does not indicate that production is complete, the user can mark the production of the item and/or the order as complete via an input to the distribution point device 120. In another example, if a scanner 110 moves from a first location to a second location, the user may update a location associated with the scanner 110 from the first location to the second location via an input to the distribution point device 120. For example, the user may provide an input to the distribution point device 120 identifying a scanner identifier 113 and an updated location identifier (e.g., updated GPS coordinates). In this example, the distribution point device 120 may transmit an indication to the production controller 104 that the scanner 110 is located at the second location.

The data router 112 of system 100B may transmit the production data 111, the scanner identifier 113 associated with the production data 111, the item information 108C, and/or any other data to the data processor 114 and the production controller 104.

As shown in FIG. 1B, the user device 118 of system 100B may retrieve or download data from the data analysis platform 116 of system 100B.

FIG. 1C shows a system 100C for implementing location-based production optimization. Common features between the system 100C for implementing location-based production optimization and the systems 100, 100B for implementing location-based production optimization will not be described again but are incorporated here in their entirety. The system 100C may not include a data processor 114. The data router 112 of system 100C may transmit the production data 111, scanner identifier 113 associated with the production data 111, the item information 108C, and/or any other data to the production controller 104.

In certain embodiments of systems 100, 100B, 100C, the production controller 104, the data processor 114, and/or the data analysis platform 116 may transmit user order information to a user computing device. The user order information may include a date/time when an order of the user was received, a current stage of the order and/or each item of the order, an estimated production completion time of the order and/or each item of the order, a date/time when production of each item and/or order was completed, and/or any other information associated with the order of the user.

In certain embodiments, the production controller 104 of systems 100, 100B, 100C may communicate with one or more physical machines (referred to hereinafter as machines or as production machines) 202A, described further below with reference to FIG. 2C. The production controller 104 may receive data from the one or more production machines 202A. The production controller 104 may be able to track an item at each production stage of the item.

Figure 2A:
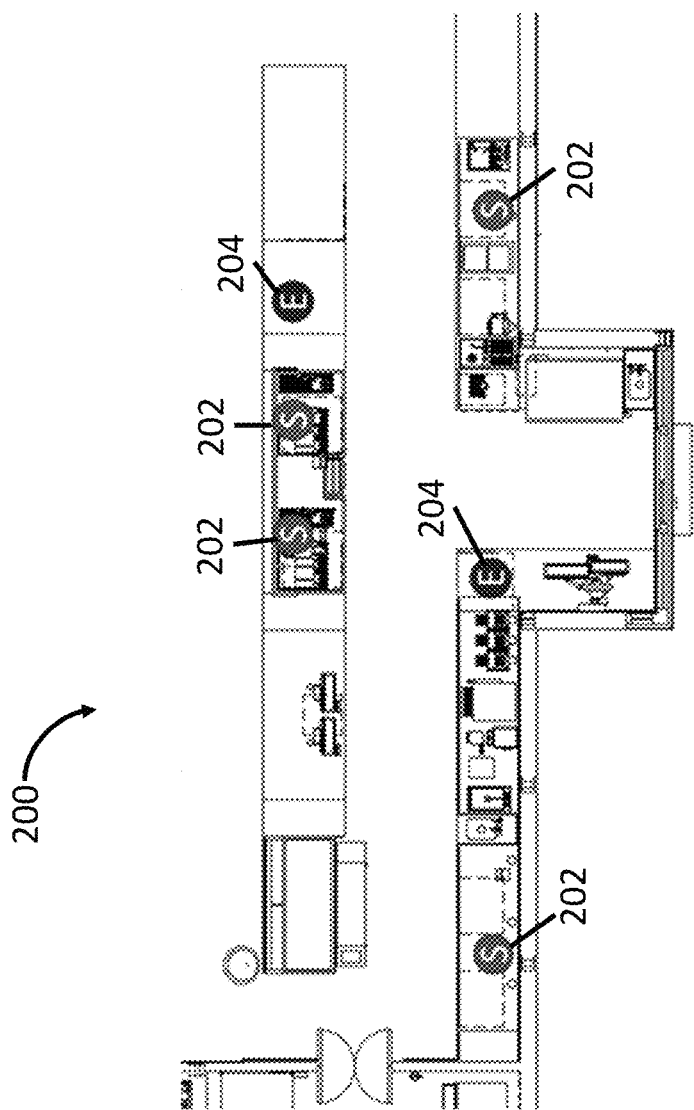
FIG. 2A illustrated a schematic of a layout of a physical environment.

The scanner 110 of systems 100, 100B, 100C may have certain advantages over manual entry of indications when production of items and/or orders are complete, such as an increased success rate at which users and/or workers indicate when production of items or orders are complete, an increased speed at which at which users and/or workers may indicate when production of items or orders are complete, an increased ease, etc. However, in certain embodiments, systems 100, 100B, 100C may include one or more stations for partial or full manual entry of indication when production of items and/or orders are complete (e.g., a touch pad for manual entry). In certain embodiments, systems 100, 100B, 100C may include a combination of scanners 110 and stations for partial or full manual entry. In certain embodiments, systems 100, 100B, 100C may include a station for partial or full manual entry at each location of a scanner 110. FIG. 2A shows a schematic of an example layout of a physical environment 200. The physical environment may include work centers 202 and distribution points 204. The work centers 202 may be any location in a physical environment 200 where a worker can produce or cause production of items, perform one or more steps for production of an item, etc. For example, a machine at a first work center can implement one or more first steps for production of the item (e.g., an espresso machine can pull one or more espresso shots) and a machine at a second work center can implement one or more second steps for production of the item (e.g., an automated syrup dispenser can dispense an amount of syrup to be added to the one or more espresso shots). In certain embodiments, the work centers 202 may be any location in the physical environment 200 where orders or a portion of a particular order can be received and/or fulfilled. In certain embodiments, the work centers 202 may be any location in the physical environment 200 with a printer 106.

Figure 2B:
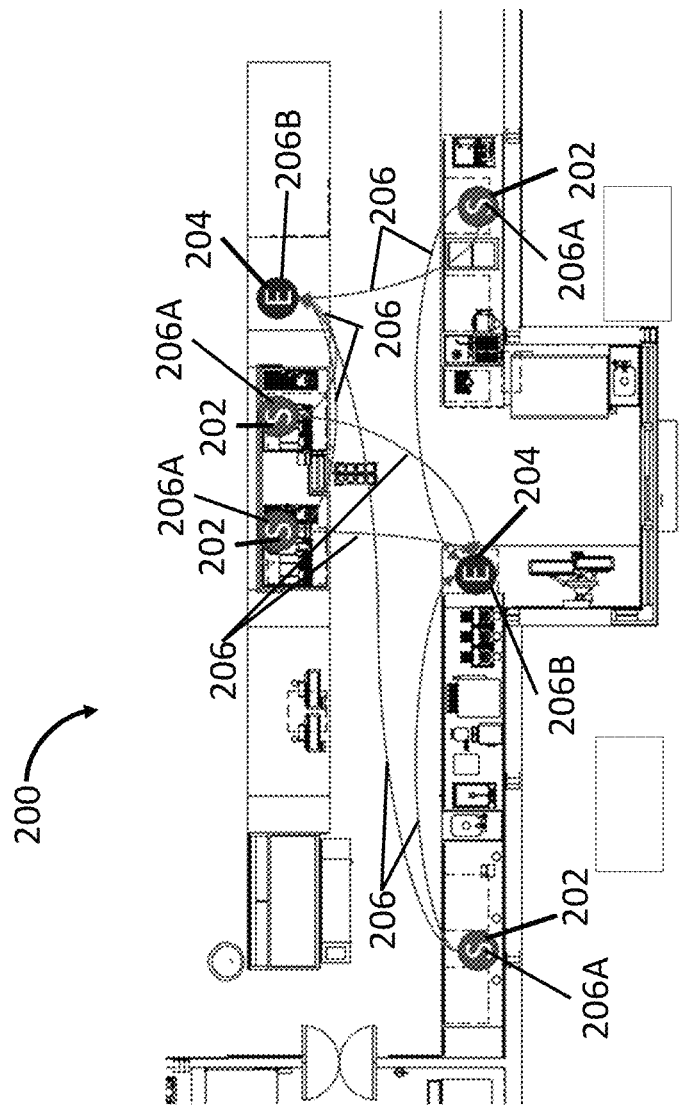
FIG. 2B illustrates a schematic of production channels of the physical environment layout of FIG. 2A.
Figure 2C:
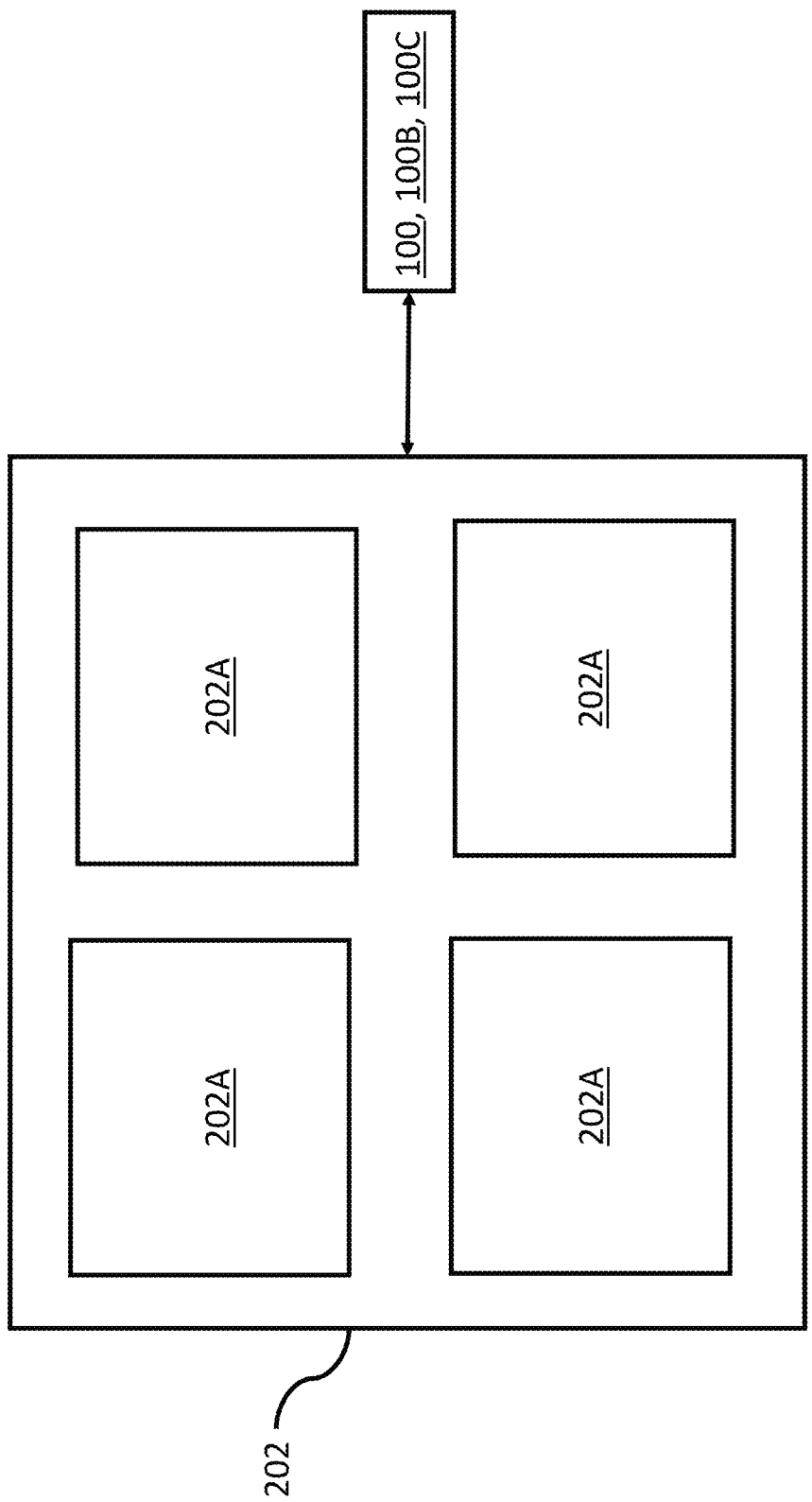
FIG. 2C illustrates a schematic of a work station of the physical environment of FIGS. 2A and 2B.

As shown in FIG. 2C, a work center 202 may include one or more production machines 202A. The one or more production machines 202A can include a coffee maker, an oven, a microwave, an item component indication system, devices for distributing or dispensing ingredients like syrups, dry ingredients, ice, milk, or other beverages components, devices for automatic distribution of beverages or beverage components, an espresso dispensing device, a milk frothing device, and/or any other beverage or food production machines or devices. The one or more production machines 202A may transmit data to the production controller 104 and/or any other components of systems 100, 100B, 100C via a wired or wireless connection. The data may be an indication that a beverage, ingredient, or component was dispensed, an indication that a production machine 202A is in use, an indication that a production machine 202A is unavailable, an indication that a production machine 202A is out of order, an indication that a production machine 202A is available, an indication that a production machine 202A is ready for use, an indication of when the production machine 202A will be ready for use, an indication of an item being produced by the production machine 202A, an indication of a user and/or worker working at a production machine 202A, and/or any other data associated with the use of a production machine 202A.

The distribution points 204 may be any location in a physical environment 200 where items and/or orders are distributed to users. For example, the distribution points 204 may be a drive thru counter, a pick up counter, an online order pick-up counter, a delivery order pick-up counter, and/or any other location in the physical environment 200 where users can pick-up or receive their order. In certain embodiments, each distribution point 204 in a physical environment 200 can include a scanner 110. Each scanner 110 may be associated with a distribution point 204 such that systems 100, 100B, 100C may know where each scanner 110 and/or distribution point 204 is in the physical environment 200. In certain embodiments, systems 100, 100B, 100C can obtain and/or store data identifying a distance from all or a portion of the distribution points 204 and scanners 110 to all or a portion of the work centers 202. Further, the systems 100, 100B, 100C can obtain and/or store data identifying a distance between all or a portion of the work centers 202.

FIG. 2B shows a schematic of the example layout of a physical environment 200 with production channels 206. The physical environment 200 may include the production channels 206. For example, the production channels 206 may be routes (e.g., navigational routes, physical routes, etc.), tracks, trails, paths, channels, etc. within (e.g., through) the physical environment. All or a portion of the production channels 206 may include a channel start 206A and a channel end 206B. For example, the channel start 206A may be a route start and the channel end 206B may be a route end. All or a portion of the production channels 206 may include one or more physical machines (e.g., production machines) distributed across the production channel. In some cases, the one or more physical machines may be one or more computing systems. A production channel 206 may be a channel including a channel start 206A, a channel end 206B, and a plurality of machines. In another example, a production channel 206 may be a channel from a channel start 206A to a channel end 206B and a plurality of machines may be located (e.g., interspersed) between the channel start 206A and the channel end 206B. In some cases, different production channels 206 may include different machines. For example, a first production channel may include a first type of coffee maker (e.g., a drip coffee maker) and a second production channel may include a second type of coffee maker (e.g., a French press coffee maker). In some cases, different production channels 206 may include the same machines. For example, a first production channel and a second production channel may each include a first type of coffee maker (e.g., a drip coffee maker). Further, the first production channel and the second production channel may include the same or different machines. The channel start 206A may be any work center 202 or location of a printer 106. The channel end 206B may be any distribution point 204. The production channels 206 may be a path the item takes from when a worker takes a label 108 for the item at a work center 202 to when the label 108 is scanned by a scanner 110 at a distribution point 204.

In certain embodiments, production channels 206 may include one or more intermediate production stages. The intermediate production stages may be any work center 202 other than the channel start 206A used to produce an item. For example, a worker may take a label 108 for an item at a first work center 202 (i.e., the channel start 206A) and the worker may produce a portion of the item at the first work center 202. The item may require the worker also produce a portion of the item at a second work center 202 (i.e., an intermediate production stage) before production of the item is complete and the label 108 is scanned by a scanner 110 at a distribution point 204 (i.e., the channel end 206B).

In certain embodiments, performance data (e.g., item production analytics, diagnostics, observations, etc.) may be calculated and/or determined (e.g., by the production controller 104, the data processor 114, and/or the data analysis platform 116). In some cases, a modelling system (e.g., a simulation system or platform) may model a physical environment based on one or more modelling parameters and the modelling system, or a separate system, may determine performance data for each modelled physical environment and one or more modelling parameters. The modelling parameters may include physical environment data, and the physical environment data may identify a configuration of the physical environment. For example, the configuration of the physical environment may include a physical environment layout, a physical environment design, a worker allocation, a machine allocation, a machine layout, physical environment operation parameters, ordering parameters, or any other data associated with the configuration of the physical environment. The physical environment data may identify a physical layout of the physical environment. For example, the physical environment data may identify the placement, type, and quantity of tables, chairs, registers, machines, products, etc. Further, the physical environment data may identify whether the physical environment includes a drive-thru component and/or a walk-in component. The physical environment data may also identify the workers allocated to the physical environment. For example, the physical environment data may identify the number, role, and/or type (e.g., management, years, or levels of experience, etc.) of workers that are allocated to the physical environment. Further, the physical environment data may identify how orders are processed and handled by the workers with the physical environment. For example, whether orders are linked to the first available workers, whether certain orders are linked together, etc. The physical environment data may further identify menu options. For example, the physical environment data may identify food and/or drink options that are available for purchase at a particular physical environment (e.g., some physical environments may not offer particular products such as cold brew coffee).

Based on the performance data, the modelling system can recommend particular physical environment data for a particular physical environment. For example, the modelling system can recommend a particular layout of machines, a particular distribution of work centers and/or distribution points, a particular allocation of workers, etc.

In one example, the performance data may include an item production time. The item production time may be calculated using Equation 1 below:

Item Production Time=(Item Delivered to Distribution Point$_{Time}$−Item Label Pulled$_{Time}$)     Equation 1

The item production time may be a time for an item to be produced from when a label 108 for the item is taken by a worker at a work center 202 (e.g., a channel start 206A) (Item Label Pulled$_{Time}$), to a time when an item is placed at a distribution point 204 and/or the label 108 is scanned by a scanner 110 at a distribution point 204 (e.g., the channel end 206B) (Item Delivered to Distribution Point$_{Time}$).

In certain embodiments, a system may determine intermediate item production times (e.g., using Equation 1). The intermediate item production time may be a time for each portion of the item to be produced by a worker. In these embodiments, if the portion of the item is produced at an intermediate production stage, the Item Label Pulled$_{Time}$ may be a time when the worker and/or the item get to or arrive at the intermediate production stage. If a worker must produce a second portion of the item at a second intermediate production stage after the intermediate production stage, the Item Delivered to Distribution Point$_{Time}$ for the intermediate item production time associated with the first intermediate production stage may be a time when the worker and/or the item get to or arrive at the second intermediate production stage. A sum of the intermediate production times associated with a particular item may be equal to the item production time for the particular item.

In another example, the performance data may include an item performance. The item performance may be calculated using Equation 2 below:

$$\text{Item Performance} = \left(\frac{\text{Ideal Production Time}}{\text{Item Production Time}}\right) \quad \text{Equation 2}$$

The item performance may be a quotient of the item production time (Item Production Time) compared to an ideal production time (Ideal Production Time). The ideal production time may be a standardized item production time. For example, the ideal production time may be based on input obtained from a modelling system. The modelling system may model one or more physical environments and production of the item in the one or more modelled physical environments based on modelling parameters (e.g., physical environment layout, workers, etc.) to generate production times. In some embodiments, the ideal production time may be an average production time for production of the item in the one or more modelled physical environments from the production times. In other embodiments, the ideal production time may be a particular production time (e.g., a fastest production time as compared to other production times) from the production times or a ratio of a particular production time (e.g., 90% of a fastest production time). In other embodiments, the ideal production time may be a mean or average production time of one or more physical environments with a similar physical environment layout, physical environment location, a time of day and/or any other physical environment attributes or information. In other embodiments, the ideal production time may be based on production time standards. The production time standard may be statically significant. In certain embodiments, the ideal production time and/or the production time standard may be updated periodically. The ideal production time and/or the production time standard may be updated based on product offerings. The ideal production time may be a time to produce an item if the work center 202 and the distribution point 204 were at a same location (i.e., no distance between the work center and the distribution point 204).

In certain embodiments, Equation 2 may be used to determine intermediate item performance. The intermediate item performance may a quotient of the intermediate item production time (Item Production Time) compared to an ideal intermediate production time (Ideal Production Time) for each intermediate production stage.

In another example, the performance data may include a work center performance and/or a distribution point performance. The work center performance may be calculated or measured by the production controller 104, the data processor 114, and/or the data analysis platform 116. The work center performance may be calculated using Equation 3 below:

$$\text{Work Center Performance} = \frac{(\text{Ideal Production Time}_{Item\ 1} \times Count_{Item\ 1}) + (\text{Ideal Production Time}_{Item\ n} \times Count_{Item\ n}) \ldots}{\sum \text{Item}_{1 \to n} \text{ Production Time(s)}}$$

Equation 3

The work center performance may be a quotient of a sum of all item production times for each item produced at a work center 202 over a period of time ($\Sigma\text{Item}_{1 \to n}$ Production Time(s)) compared to a sum of ideal production times for each item produced at a work center 202 over a period of time ((Ideal Production Time$_{Item\ 1}$×Count$_{Item\ 1}$)+(Ideal Production Time$_{Item\ n}$×Count$_{Item\ n}$)) (e.g., as determined by a modelling system).

In certain embodiments, Equation 3 may be used to determine intermediate work center performance 306B. The intermediate work center performance may be a quotient of a sum of all intermediate item production times for each portion of an item produced at a work center 202 over a period of time ($\Sigma\text{Item}_{1 \to n}$, Production Time(s)) compared to a sum of ideal production times for each portion of an item produced at the work center 202 over a period of time ((Ideal Production Time$_{Item\ 1}$×Count$_{Item\ 1}$)+(Ideal Production Time$_{Item\ n}$×Count$_{Item\ n}$)).

In certain embodiments, Equation 3 may be used to determine a distribution point performance. The distribution point performance may be a sum of all item production times for each item scanned by a scanner 110 at a distribution point 204 over a period of time ($\Sigma\text{Item}_{1 \to n}$, Production Time(s)) compared to a sum of ideal production times for each item scanned by a scanner 110 at the distribution point 204 over a period of time ((Ideal Production Time$_{Item\ 1}$× Count$_{Item\ 1}$)+(Ideal Production Time$_{Item\ n}$×Count$_{Item\ n}$)).

In another example, the performance data may include a physical environment performance. The physical environment performance may be calculated or measured by the production controller 104, the data processor 114, and/or the data analysis platform 116. The physical environment performance may be calculated using Equation 4 below:

$$\text{Store Perf} = \frac{\sum (\text{Ideal Production Time}_{N\ Items})}{\sum (\text{Production Time}_{N\ Items})}$$

Equation 4

The physical environment performance may be a quotient of a sum of all item production times for each item produced at a physical environment over 200 over a period of time ($\Sigma$(Production Time$_{N\ Items}$)) compared to a sum of ideal production times for each item produced at a physical environment 200 over a period of time ($\Sigma$(Ideal Production Time$_{N\ Items}$)) (e.g., as determined by a modelling system).

The item performance, the intermediate item performance, the work center performance, the intermediate work center performance, the distribution point performance and/or the physical environment performance may be a quotient or a percentage value representative of the quotient. The item performance, the intermediate item performance, the work center performance, the intermediate work center performance, the distribution point performance and/or the physical environment performance may represent an efficiency of production of a specific item, a specific work center 202, a specific distribution point 204, and/or a specific physical environment 200.

An item performance and/or an intermediate item performance less than (i.e., ≤1) may indicate how much slower an item or a portion of the item is produced when compared to the ideal production time or the ideal intermediate production time. An item performance and/or an intermediate item performance greater than (i.e., ≥1) may indicate how much faster an item or a portion of the item is produced when compared to the ideal production time or the ideal intermediate production time.

A work center performance and/or an intermediate work center performance less than (i.e., ≤1) may indicate how much slower items or a portion of the items are produced at a specific work center 202 when compared to the ideal production time or the ideal intermediate production time. A work center performance and/or an intermediate work center performance greater than (i.e., ≥1) may indicate how much faster an item or a portion of the item is produced at a specific work center 202 when compared to the ideal production time 304A or the ideal intermediate production time.

A distribution point performance less than (i.e., ≤1) may indicate how much slower items are produced when distributed at a specific distribution point 204 when compared to the ideal production time. A distribution point performance greater than (i.e., ≥1) may indicate how much faster an item or a portion of the item is produced when distributed at a specific distribution point 204 when compared to the ideal production time.

A physical environment performance less than (i.e., ≤1) may indicate how much slower items are produced at a specific physical environment 200 compared to the ideal production time. A distribution point performance greater than (i.e., ≥1) may indicate how much faster an item or a portion of the item is produced a specific physical environment 200 when compared to the ideal production time.

In another example, the performance data may include a speed of service. The speed of service may be calculated using Equation 5 below:

Order Speed of Service=(All Items Delivered to HOP$_{Time}$−Order Created$_{Time}$)  Equation 5

The speed of service (Order Speed of Service) may be a time from when an order is placed by a user (Order Created$_{Time}$), to a time when all items in an order have been placed at a distribution point 204 and/or scanned by a scanner 110 at a distribution point 204 (All Items Delivered to HOP$_{Time}$).

In another example, the performance data may include an order production time. The order production time may be calculated using Equation 6 below:

Order Production Time=(All Items Delivered to HOP$_{Time}$−First Item Label Pulled$_{Time}$)  Equation 6

The order production time (Order Production Time) may be a time from when a first label 108 associated with an item in the order is taken by a worker (First Item Label Pulled$_{Time}$), to a time when all items in an order have been placed at a distribution point 204 and/or scanned by a scanner 110 at a distribution point 204 (All Items Delivered to HOP$_{Time}$).

Categorized calculations of the item performance, the intermediate item performance, the work center performance, the intermediate work center performance, the distribution point performance, the physical environment performance, the speed of service, and/or the order production time may be calculated for one or more of the following categories: specific items, specific variations of an item (i.e., a modified item with altered ingredients), specific workers, specific work centers 202, specific distribution points 204, specific categories of distribution points 204 (i.e., a drive thru counter, an pick up counter, an online order pick-up counter, a delivery order pick-up counter, etc.), specific physical environments 200, specific times of day, specific days of the week, specific times of year, specific order origins, and/or any combination thereof.

In certain embodiments, the production controller 104, the data processor 114 and/or the data analysis platform 116 may use the item performance, the intermediate item performance, the work center performance, the intermediate work center performance, the distribution point performance, the physical environment performance, the speed of service, the order production time, and/or categorized calculations thereof as input data for any of the calculations or optimizations described herein.

In certain embodiments, the production controller 104, the data processor 114 and/or the data analysis platform 116 may use locations of scanners 110/distribution points 204 in a physical environment 200, and/or distances between the scanners 110/distribution points 204 and work centers 202 in the physical environment 200 as input data for various calculation or optimizations.

In certain embodiments, the production controller 104, the data processor 114 and/or the data analysis platform 116 may compare the item performance, the intermediate item performance, the work center performance, the intermediate work center performance, the distribution point performance, the physical environment performance, the speed of service, the order production time, and/or categorized calculations thereof across various categories to determine optimized physical environments 200, physical environment layouts, worker schedules, order schedules, etc. For example, a specific worker may more efficient when producing items at a specific work center 202, or the specific worker may more efficient when working with certain other workers.

The production controller 104, the data processor 114 and/or the data analysis platform 116 may use the input data to generate virtual replications of physical environments 200. The production controller 104, the data processor 114 and/or the data analysis platform 116 may use the virtual replications of physical environments to determine optimized layouts for specific physical environments 200.

In certain embodiments, based on the input data, the production controller 104, the data processor 114 and/or the data analysis platform 116 may determine optimized layouts for the physical environment 200, wherein optimized layouts for the physical environment 200 are based on layouts with a calculated highest efficiency or calculated highest item performance, intermediate item performance, work center performance, intermediate work center performance, distribution point performance, physical environment performance, and/or the calculated smallest speed of service, and/or order production time. In some embodiments, a modelling system may calculate the item performance, the intermediate item performance, the work center performance, the intermediate work center performance, the distribution point performance, the physical environment performance, the speed of service, and/or the order production time for one or more modelled physical environments with various modelling parameters. Further, the modelling system may compare one or more of the item performance, the intermediate item performance, the work center performance, the intermediate work center performance, the distribution point performance, the physical environment performance, the speed of service, and/or the order production time for the one or more modelled physical environments with the various modelling parameters to determine recommended physical environment parameters.

In certain embodiments, the production controller 104, the data processor 114 and/or the data analysis platform 116 may determine worker work schedules based on input data. The production controller 104, the data processor 114 and/or the data analysis platform 116 may determine worker work schedules to optimize production for a physical environment 200, wherein optimized production is based on worker schedules with a calculated highest efficiency or calculated highest item performance, intermediate item performance, work center performance, intermediate work center performance, distribution point performance, physical environment performance, and/or the calculated smallest speed of service, and/or order production time.

In certain embodiments, the production controller 104, the data processor 114 and/or the data analysis platform 116 may use input data to determine items with the lowest production efficiency. The production controller 104, the data processor 114 and/or the data analysis platform 116 may optimize production for each item, wherein optimized production is based on physical environment layouts for each item with a calculated highest production efficiency.

In certain embodiments, the production controller 104, the data processor 114 and/or the data analysis platform 116 may determine a last item produced in an order. The last item produced in an order may be the last item in the order to be placed at a distribution point 204 and/or scanned by a scanner 110 at a distribution point 204. In certain embodiments, the production controller 104, the data processor 114 and/or the data analysis platform 116 may determine and keep track of which work center 202 and/or worker produced the last item produced. In certain embodiments, the production controller 104, the data processor 114 and/or the data analysis platform 116 may determine and keep track of which work centers 202 produced the last item produced. In certain embodiments, the production controller 104, the data processor 114 and/or the data analysis platform 116 may determine or keep track of a production channel 206 of the last item produced.

In certain embodiments, the production controller 104, the data processor 114 and/or the data analysis platform 116 may use the last item produced, the work center 202 and/or the worker that produced the last item, and/or the production channel 206 as input data for any of the calculations or optimizations described herein.

In certain embodiments, the production controller 104, the data processor 114 and/or the data analysis platform 116 may use the input data to calculate an optimized order schedule. The optimized order schedule may be based on an order schedule with a highest efficiency, wherein an order schedule with the highest efficiency is an order schedule with a calculated highest item performance, intermediate item performance 302B, work center performance, intermediate work center performance, distribution point performance, physical environment performance, and/or the calculated smallest speed of service, and/or order production time as compared to other order schedules. In certain embodiments, the optimized schedule may be calculated for each physical environment.

In certain embodiments, the production controller 104, the data processor 114 and/or the data analysis platform 116 may use the input data to calculate optimized item pricing.

The optimized item pricing may be based at least in part on an item production time. For example, the production controller 104, the data processor 114 and/or the data analysis platform 116 may determine a higher price, as compared to the price of another item, for an item that has a higher production time as compared to the production time of the another item.

In some embodiments, the production controller 104, the data processor 114 and/or the data analysis platform 116 may execute a machine learning model based at least in part on the input data. For example, the production controller 104, the data processor 114 and/or the data analysis platform 116 may provide the input data to the machine learning model as an input. The machine learning model may output performance data based on the input data. For example, the machine learning model may predict performance data associated with the one or more first machines based at least in part on the input data. For example, the machine learning model may predict performance data associated with an espresso machine, a milk frother, a coffee maker, an oven, an object component indication system, a distribution device, or a production system, etc. The production controller 104, the data processor 114 and/or the data analysis platform 116 may instruct execution of a machine according to the performance data.

In some embodiments, to instruct execution of the machine, the production controller 104, the data processor 114 and/or the data analysis platform 116 may generate at least one of a layout or a schedule based at least in part on the performance data. For example, the production controller 104, the data processor 114 and/or the data analysis platform 116 may generate a layout of one or more machines based on the performance data, a worker schedule, a machine schedule, etc. In some embodiments, the performance data may include at least one of a layout or a schedule. The production controller 104, the data processor 114 and/or the data analysis platform 116 may instruct the machine to output the at least one of the layout or the schedule. For example, the production controller 104, the data processor 114 and/or the data analysis platform 116 may instruct the machine to display (e.g., via a user interface), print, etc. the layout and/or the schedule.

In some embodiments, the production controller 104, the data processor 114 and/or the data analysis platform 116 may instruct the one or more first machines to automatically perform one or more operations in a particular order. For example, the production controller 104, the data processor 114 and/or the data analysis platform 116 may instruct a first machine to perform a first operation at a first time, a second machine to perform a second operation at a second time subsequent to the second time, etc.

In some embodiments, the production controller 104, the data processor 114 and/or the data analysis platform 116 may instruct execution of one or more second machines according to the performance data. For example, the input data and/or the performance data may correspond to one or more first machines and the production controller 104, the data processor 114 and/or the data analysis platform 116 may utilize input data and/or performance data corresponding to one or more first machines to instruct execution of one or more second machines.

In some embodiments, the production controller 104, the data processor 114 and/or the data analysis platform 116 may train the machine learning model using training data to obtain a trained machine learning model. The production controller 104, the data processor 114 and/or the data analysis platform 116 may execute the trained machine learning model.

Simulated Virtual Environments

Systems, methods, and devices for simulating virtual environments are described in U.S. application Ser. No. 18/053,726, filed on Nov. 8, 2022, which is hereby incorporated by reference in its entirety for all purposes.

The production controller 104, the data processor 114, and/or the data analysis platform 116 as describe above with reference to FIGS. 1A-2C may be any of the physical environment management system 302, the production computing system 304, the inventory management computing system 306 (e.g., an object management computing system), the simulation computing system 308, and/or the management system 312 described below with reference to FIGS. 3-5.

The production data 111, all or a portion of the performance data calculated and/or determined (e.g., by the production controller 104, the data processor 114, and/or the data analysis platform 116), and/or any of the other data or information described above with reference to FIGS. 1A-2C may be the performance data, the production data, and/or any of the data described below with reference to FIGS. 3-5.

Figure 3:
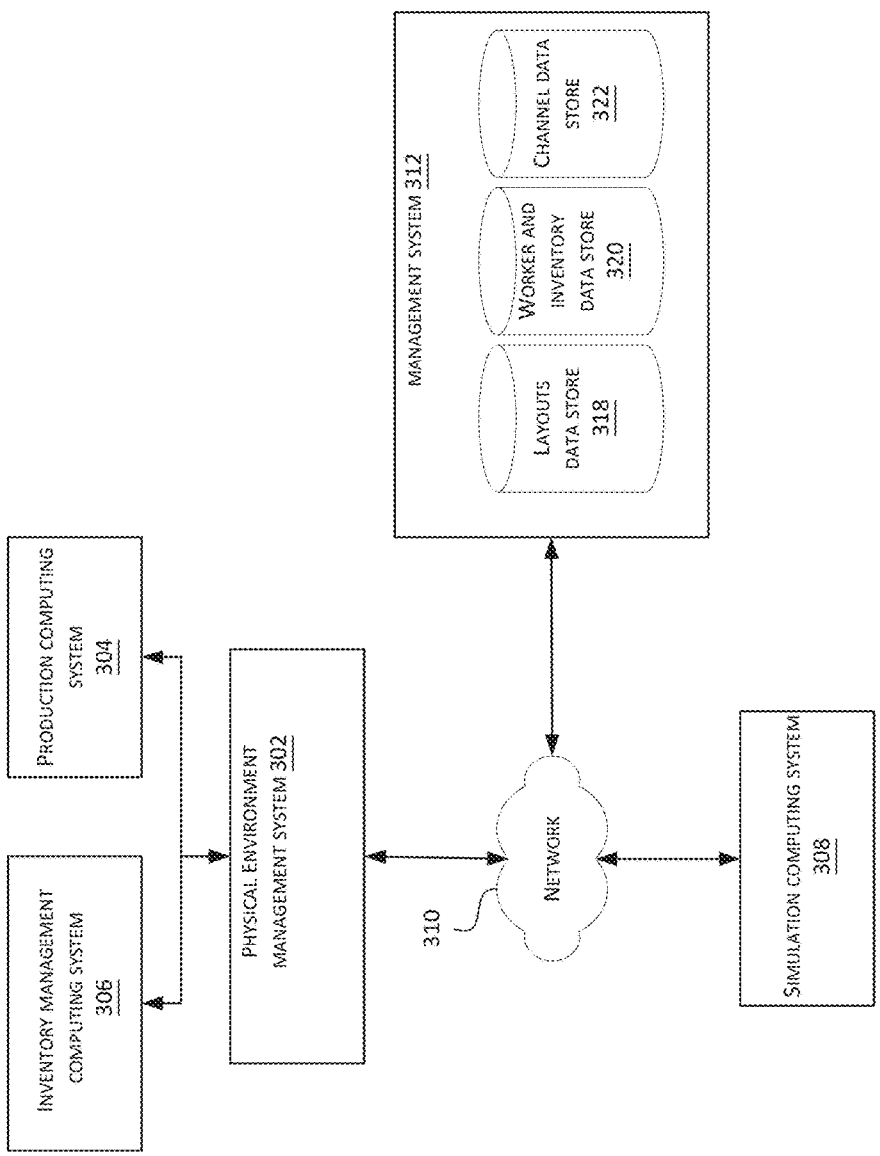
FIG. 3 illustrates a block diagram depicting an illustrative environment in which a management system can manage one or more virtual replications of a physical environment.

FIG. 3 is a block diagram of an illustrative operating environment 300 in which a physical environment management system 302 (e.g., a computing system associated with a physical environment) and a simulation computing system 308 (e.g., a computing system for implementing a simulation platform for generation of virtualizations associated with the physical environment) may interact with management system 312 via a network 310. For example, the virtualizations may include virtual replications, virtual environments, virtual physical environments, virtual models, simulations, etc.

While the below disclosure discusses a particular physical environment (e.g., a store), it will be understood that the below disclosure can be implemented with respect to any physical environment (e.g., a store, a building, an office, a factory, a business, etc.).

The physical environment management system 302, the simulation computing system 308, and the management system 312 may be a closed loop system. By way of illustration, the physical environment management system 302 may include various types of computing devices and/or computing systems that may be in communication with the management system 312, including a desktop computer, laptop, and a mobile phone. In general, the management system 312 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

By way of further illustration, the simulation computing system 308 can include various types of computing devices and/or computing systems for implementing the simulation platform, including a server, a desktop computer, a laptop computer, a mobile phone, etc. In general, the simulation computing system 308 may be any computing device for implementing the simulation platform and may be in communication with the management system 312 in order to receive physical environment data and generate a virtual replication of the physical environment based on the physical environment data. In some embodiments, the simulation computing system 308 may include a general computing device hosting particular software for implementing the simulation platform. Therefore, the simulation computing system 308 may be any computing device for implementing a simulation platform for building virtual replications of a physical environment.

The management system 312 may route the physical environment data to the simulation computing system 308 and may receive and compare production data associated with the virtual replications of the physical environments. The management system 312 may provide the output to the physical environment management system 302 or any other computing devices based on the comparison. The management system 312 can provide the physical environment management system 302 (or any other computing devices) with one or more user interfaces, command-line interfaces (CLI), application programing interfaces (API), and/or other interfaces for displaying one or more outputs based on the comparison (e.g., as part of a computer display). Although one or more embodiments may be described herein as using a user interface, it should be appreciated that such embodiments may, additionally or alternatively, use any CLIs, APIs, or other interfaces.

Network

The physical environment management system 302, the simulation computing system 308, and the management system 312 may communicate via a network 310, which may include any wired network, wireless network, or combination thereof. For example, the network 310 may be a personal area network, local area network, wide area network, over-the-air broadcast network (e.g., for radio or television), cable network, satellite network, cellular telephone network, or combination thereof. As a further example, the network 310 may be a publicly accessible network of linked networks, possibly operated by various distinct parties, such as the Internet. In some embodiments, the network 310 may be a private or semi-private network, such as a corporate or university intranet. The network 310 may include one or more wireless networks, such as a Global System for Mobile Communications (GSM) network, a Code Division Multiple Access (CDMA) network, a Long Term Evolution (LTE) network, or any other type of wireless network. The network 310 can use protocols and components for communicating via the Internet or any of the other aforementioned types of networks. For example, the protocols used by the network 310 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, one or more of the physical environment management system 302, the simulation computing system 308, the management system 312 may communicate with the inventory management computing system 306 and/or the production computing system 304 via the network 310.

Inventory Management System

The inventory management computing system 306 may be implemented directly in hardware or software executed by hardware devices and may, for instance, include one or more physical or virtual servers implemented on physical computer hardware configured to execute computer executable instructions for performing various features that will be described herein.

The inventory management computing system 306 may receive inventory data from one or more sensors and/or one or more data stores. For example, the inventory management computing system 306 may identify inventory (e.g., products, equipment, items, etc.) allocated to or associated with a particular physical environment. For example, the inventory may include food products (e.g., sandwiches, eggs, sugar, artificial sweetener, etc.), drink products (e.g., coffee, tea bags, milk, cream, etc.), non-food or drink products (e.g., nitrogen, cutlery, napkins, straws, etc.), or any other products associated with the physical environment. Further, the inventory management computing system 306 may identify inventory data associated with (e.g., delivered to) a particular physical environment. For example, the inventory management computing system 306 may be in communication with and/or may include one or more sensors (e.g., cameras) for monitoring the delivery of inventory. Further, the inventory management computing system 306 may manage the provision of the inventory. The inventory management computing system 306 may be in communication with and/or may include one or more sensors for managing previously delivered inventory. For example, the inventory management computing system 306 may include one or more sensors for managing inventory stored in a storeroom. In some embodiments, the inventory management computing system 306 may identify the inventory data based on worker feedback (e.g., robot worker feedback or human worker feedback). The worker feedback may include an indication of inventory dispense (e.g., dispensed to users). Further, based on receiving the worker feedback, the inventory management computing system 306 may validate the accuracy of the worker feedback. For example, the inventory management computing system 306 may calculate an amount of inventory based on the worker feedback and may validate the amount of inventory (e.g., by confirming the amount of inventory was provided to users or the amount of inventory remains in the physical environment). In some embodiments, the inventory management computing system 306 may identify the inventory data based on tracked purchases. For example, the inventory management computing system 306 may identify a base amount of inventory and may modify the based amount of inventory based on the tracked purchases.

The inventory management computing system 306 may periodically or aperiodically provide the inventory data to the physical environment management system 302. For example, the inventory management computing system 306 may provide the inventory data to the physical environment management system 302 every hour, every day, etc. In some embodiments, the inventory management computing system 306 may provide the inventory data to the physical environment management system 302 based on a request from the physical environment management system 302.

Production Computing System

The production computing system 304 may be implemented directly in hardware or software executed by hardware devices and may, for instance, include one or more physical or virtual servers implemented on physical computer hardware configured to execute computer executable instructions for performing various features that will be described herein.

As will be discussed below, the production computing system 304 may receive performance data from one or more sensors, computing systems, and/or one or more data stores. The performance data may identify how one or more components (e.g., workers, equipment, etc.) are performing. The production computing system 304 may include one or more computing systems for identifying performance data associated with the physical environment. In some embodiments, the production computing system 304 may include a computing system (e.g., a vision system) for monitoring worker movement and worker utilization. For example, the production computing system 304 may be in communication with and/or may include a plurality of sensors stationed at various locations throughout the physical environment. The production computing system 304 may utilize the sensors to identify workers and assign tasks to workers. Based on the assigned tasks to workers, the production computing system 304 can determine efficiency associated with particular tasks or particular workers, timing associated with particular tasks or particular workers, etc. In some embodiments, the production computing system 304 may include a computing system for monitoring machine utilization and/or performance. For example, the production computing system 304 may be in communication with and/or may include a plurality of machines (e.g., the machines or sensors associated with the machines) to identify machine timing and/or machine efficiency. The plurality of machines may include a refrigerator, a freezer, a water filtration system, a heating, ventilation, and air conditioning system, an oven, a coffee machine, an espresso machine, a food display case, a chilled food display case, a blender, a specialty coffee machine, etc. Further, the plurality of machines may include multiple of the same type of machine (e.g., the plurality of machines may include multiple blenders). Each of the plurality of machines may communicate with the production computing system via a network (e.g., network 310). In some embodiments, the production computing system 304 may include a computing system for monitoring overall performance (e.g., order timing, order history, order efficiency, physical environment capacity, drive thru capacity, etc.). For example, the production computing system 304 may monitor the number of orders placed in or at a physical environment, the number of orders placed via the drive-thru, the wait time associated with particular orders (e.g., in-building orders and/or drive-thru orders), etc.

The production computing system 304 may periodically or aperiodically provide the performance data to the physical environment management system 302. For example, the production computing system 304 may provide the performance data to the physical environment management system 302 every hour, every day, etc. In some embodiments, the production computing system 304 may provide the performance data to the physical environment management system 302 based on a request from the physical environment management system 302.

Physical Environment Management System

To manage the data associated with a particular physical environment, the physical environment management system 302 can receive a plurality of data from the production computing system 304, the inventory management computing system 306, and/or any other computing systems. The physical environment management system 302 can parse the plurality of data in order to generate the production data. For example, the physical environment management system 302 can parse (e.g., filter, modify, etc.) The plurality of data to identify production data associated with the particular physical environment. For example, the physical environment management system 302 can filter the plurality of data associated with a particular time period (e.g., a particular day), a particular physical environment, a particular location within the physical environment (e.g., particular machines), a particular worker associated with the physical environment, etc. Therefore, the physical environment management system 302 can filter the plurality of data to identify particular production data. In an illustrative embodiment, the physical environment management system 302 is a user computing device and a user may identify or select particular data. For example, the user may designate particular data (e.g., data associated with particular machines, particular inventory, particular workers, etc.) as production data. The physical environment management system 302 may include a variety of components to enable interaction between the physical environment management system 302 and a user. For example, the physical environment management system 302 may include a display system (e.g., a user interface) that causes display of information via the physical environment management system 302. In one embodiment, the display may be displayed by an additional computing system.

The physical environment management system 302 may further identify physical environment data associated with the physical environment. The physical environment data may identify a configuration of the physical environment. For example, the configuration of the physical environment may include a physical environment layout, a physical environment design, a worker allocation, a machine allocation, a machine layout, physical environment operation parameters, ordering parameters, or any other data associated with the configuration of the physical environment. The physical environment data may identify a physical layout of the physical environment. For example, the physical environment data may identify the placement, type, and quantity of tables, chairs, registers, machines, products, etc. Further, the physical environment data may identify whether the physical environment includes a drive-thru component and/or a walk-in component. The physical environment data may also identify the workers allocated to the physical environment. For example, the physical environment data may identify the number, role, and/or type (e.g., management, years, or levels of experience, etc.) of workers that are allocated to the physical environment. Further, the physical environment data may identify how orders are processed and handled by the workers with the physical environment. For example, whether orders are linked to the first available workers, whether certain orders are linked together, etc. The physical environment data may further identify menu options. For example, the physical environment data may identify food and/or drink options that are available for purchase at a particular physical environment (e.g., some physical environments may not offer particular products such as cold brew coffee). The physical environment management system 302 may identify the physical environment data based on user input (e.g., via a user computing device) and/or via one or more sensors (e.g., one or more cameras to capture the configuration of the physical environment). Therefore, the physical environment management system 302 can identify production data identifying production of the physical environment and physical environment data identifying a configuration of the physical environment.

Simulation Computing System

The physical environment management system 302 may route the physical environment data to the management system 312, and the management system 312 may route the physical environment data to the simulation computing system 308. In some embodiments, the simulation computing system 308 may receive the physical environment data directly from the physical environment management system 302. The simulation computing system 308 may receive the physical environment data and implement a simulation platform for generating a virtual replication of the physical environment based on the physical environment data. The simulation platform can perform modeling (e.g., physical environment modeling) in order to build a virtual replication of the physical environment that is based on the configuration of the physical environment. Further, the virtual replication of the physical environment built by the simulation platform may produce virtual production data that is the same as or similar to the production data produced by the physical environment. For example, the simulation platform may be trained based on known mappings of physical environment data to production data such that the simulation platform can generate a virtual replication of the physical environment that produces virtual production data that tracks the production data produced by the physical enviornment.

The simulation computing system 308 may further generate a plurality of virtual modified replications of the physical environment by modifying all or a portion of the physical environment data associated with the physical environment. For example, the simulation computing system 308 may generate a first virtual modified replication of the physical environment by adding or removing particular machines, a second virtual modified replication of the physical environment by adding or removing an ordering option, a third virtual modified replication of the physical environment by adding or removing particular options from the menu, etc.

In order to determine the production data associated with each virtual replication of the physical environment, the simulation computing system 308 may simulate the virtual replication of the physical environment and determine production data for each virtual replication of the physical environment. In simulating the virtual replication of the physical environment, the simulation computing system 308 can provide various production and/or labor scenarios to the virtual replication of the physical environment and simulate how the virtual replication of the physical environment responds to each scenario based on the physical environment data. Further, the simulation computing system 308 can obtain various timing data associated with particular orders (e.g., particular products) and/or particular tasks (e.g., cleaning machines, making a particular drink, etc.). Therefore, the simulation computing system 308 can identify virtual production data associated with each virtual replication of the physical environment.

Management System

In order to generate an output associated with the physical environment, the management system 312 may receive the production data associated with the physical environment from the physical environment management system 302 and the virtual production data associated with each of the virtual replications of the physical environment from the simulation computing system 308. The management system 312 may include one or more components to compare the production data and the virtual production data. In some embodiments, the management system 312 may include a machine learning model (e.g., a neural network) trained to identify a particular optimized set of physical environment data (e.g., a configuration of the physical environment) based on the production data and the virtual production data. Further, the management system 312 may compare the production data and the virtual production data to determine if differences (e.g., statistically significant differences) exist between the production data and the virtual production data. The management system 312 may then determine if the difference between the production data and the virtual production data exceeds a particular threshold (e.g., a threshold set by a user via a user computing device).

The management system 312, based on identifying a difference between a particular set of virtual production data and the production data, can generate an output associated with the physical environment. The management system 312 can cause the output to be displayed via a user computing device (e.g., the physical environment management system 302). In some embodiments, the management system 312 can cause the automatic implementation of particular physical environment data. For example, the management system 312 may automatically adjust how orders are processed and assigned to the workers based on identifying that the adjustment is associated with increases in speed of service, worker efficiency, machine efficiency, etc.

Layout Data Store

The management system 312 may include a layout data store 318. The layout data store 318 may identify one or more layouts that are available for a particular physical environment. For example, the layout data store 318 may identify layouts previously associated with the physical environment, layouts associated with similar physical environments, layouts derived from the current layout of the physical environment (e.g., by modifying particular physical environment data associated with the current physical environment data). The layouts identified by the layout data store 318 may indicate physical layouts of the physical environment. For example, the layouts may indicate a physical layout of the machines, the tables and/or chairs, the merchandise and/or the merchandise stands, the restroom(s), and/or any other physical components within the physical environment. The layouts may further identify a size and/or shape of the physical environment (e.g., via a floorplan associated with the physical environment). By identifying the layouts, the management system 312 may dynamically monitor and identify potential layouts for the physical environment. Further, the management system 312 can provide the potential layouts to the simulation computing system 308 for generation of the virtual replications of the physical environment. In some embodiments, the management system 312 may also store the current layout of the physical environment in the layout data store 318.

Worker and Inventory Data Store

Further, the management system 312 may include a worker and inventory data store 320. The worker and inventory data store 320 may identify worker and/or inventory data (e.g., potential worker allocations and/or potential inventory allocations) for a particular physical environment. For example, the worker and inventory data store 320 may identify a number of workers (e.g., five workers), a type of workers (e.g., management, non-management, etc.), a number of workers for a particular station (e.g., two workers are assigned to an espresso machine), an experience level of workers (e.g., five years of experience, no experience, training, etc.), a schedule for the workers, or any other worker data for allocation of workers to the physical environment. Further, the worker and inventory data store 320 may identify a quantity of inventory, a type of inventory, a location of inventory, an inventory delivery schedule, an amount of inventory to order, a product mix, or any other inventory data for allocation of inventory to the physical environment. The worker and/or inventory data allocations of workers and/or inventory previously associated with the physical environment, allocations of workers and/or inventory associated with similar physical environments, allocations of workers and/or inventory derived from the current allocation of workers and/or inventory of the physical environment (e.g., by modifying particular physical environment data associated with the current physical environment data). By identifying the worker and/or inventory data, the management system 312 may dynamically monitor and identify potential allocations of workers and/or inventory for the physical environment. Further, the management system 312 can provide the potential allocations of workers and/or inventory to the simulation computing system 308 for generation of the virtual replications of the physical environment. In some embodiments, the management system 312 may also store the current allocation of workers and/or inventory of the physical environment in the worker and inventory data store 320.

Channel Data Store

The management system 312 may include a channel data store 322. The channel data store 322 may identify one or more potential mixtures of channels (e.g., channels of traffic) for a particular physical environment. Further, the mixtures of channels identified by the channel data store 322 may indicate physical channels of traffic of the physical environment. For example, the channel data store 322 may identify potential mixture of traffic (e.g., in-environment traffic, drive-thru traffic, curbside traffic, mobile order (e.g., orders placed via a user computing device) traffic, or any potential channel of traffic to the physical environment). Further, the channel data store 322 may identify different potential mixtures of the different channels of traffic. For example, a first mixture may include 90% of traffic is in-environment traffic and 30% of traffic is drive-thru traffic, a second mixture may include 59% of traffic is mobile ordering traffic, 21% of traffic is curbside traffic, and 20% of traffic is in-environment traffic, etc. It will be understood that the mixtures of channels may include any combination of different channels of traffic. By identifying the mixtures of channels, the management system 312 may dynamically monitor and identify potential mixtures of channels for the physical environment. Further, the management system 312 can provide the potential mixtures of channels to the simulation computing system 308 for generation of the virtual replications of the physical environment. In some embodiments, the management system 312 may also store the current mixture of channels of the physical environment in the channel data store 322.

It will be understood that many of the components described in FIG. 3 are optional, and that embodiments of the present disclosure may combine or reorganize the components. Further, embodiments of the present disclosure may include less, different, or more components. Furthermore, the components need not be distinct or discrete. For example, the management system 312 may be represented in a single physical device, or, alternately, may be split into multiple physical devices.

Process for Generating Virtual Replications of a Physical Environment

Figure 4A:
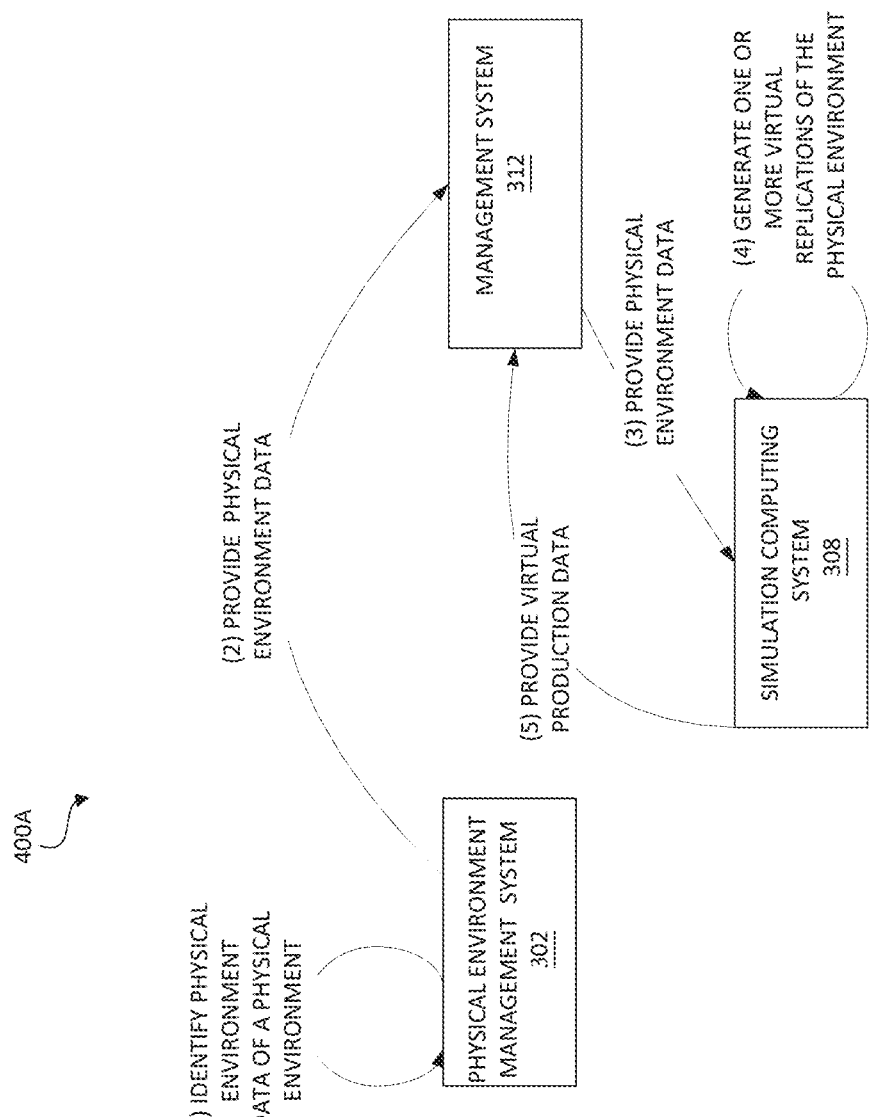
FIGS. 4A and 4B illustrate flow diagrams depicting example interactions for generating the virtual replications of the physical environment.

To further illustrate how the simulation computing system 308 may generate virtual replications of a physical environment and provide associated, virtual replication data to a management system, FIG. 4A depicts illustrative interactions 400A for identifying physical environment data, generating virtual replications of a physical environment based on the physical environment data, and providing virtual production data based on the virtual replications of the physical environment. The interactions 400A of FIG. 4A may occur, for example, during operation of a physical environment and/or in response to a prompt from a user. Further, the interactions 400A may occur or after an initial configuration of a physical environment.

The interactions of FIG. 4A begin at (1), where a physical environment management system 302 identifies physical environment data of a physical environment. The physical environment management system 302 may identify the physical environment data based on a physical environment identifier associated with a particular physical environment (e.g., a physical environment identifier assigned and/or provided to the physical environment management system). The physical environment management system 302 may receive the physical environment data via a registration process of the physical environment with the physical environment management system 302. Further, the physical environment management system 302 may receive the physical environment data as batch physical environment data or as streaming physical environment data (e.g., physical environment data received in real time). In some embodiments, the physical environment management system 302 may receive the physical environment data from a user computing device, one or more sensors, and/or any other devices. Further, the physical environment management system 302 may identify the physical environment data by analyzing the operation of the physical environment (e.g., to determine the physical environment configuration). The physical environment management system 302 may store the identified physical environment data and may update the stored physical environment data based on subsequently identified physical environment data.

The physical environment data may include data identifying the configuration of the physical environment. For example, the physical environment data may include data identifying a time period for production of particular products and/or particular orders (e.g., a time period for completion of particular orders by hand, by machine, etc.). Further, the physical environment data may include data identifying a time period for particular tasks (e.g., a time required for completion of a particular task). The physical environment data may also include physical environment layout data, worker allocation data, product mixture data, channel mixture data, order data, etc. For example, the physical environment data may identify a physical environment schematic and/or floorplan, the production engine layout of the physical environment, the physical layout of the physical environment, the physical layout of machines within the physical environment, the physical layout of the drive-thru, the physical layout of furniture within the physical environment, a quantity, type, and/or quality of machines within the physical environment, a mixture of channels of traffic associated with the physical environment, a mixture of products associated with the physical environment, worker allocation, an order history, etc. The mixture of products associated with the physical environment may identify a mixture of product types and/or number of items for each order (e.g., 40% of orders include at least 2 items, 40% of orders include an americano, etc.). Further, the mixture of channels may identify a mixture of channels of traffic (e.g., 30% of orders are ordered via a drive-thru, 20% of orders are ordered in-environment, 10% of orders are ordered via a mobile order, etc.) The order history may identify a course of orders across a day (e.g., the order history may identify a peak order time window, a non-peak order time window, etc.). Therefore, the physical environment management system 302 can identify the physical environment data of the physical environment.

Based on identifying the physical environment data, at (2), the physical environment management system 302 provides the physical environment data to the management system 312. The physical environment management system 302 may parse the physical environment data and provide a subset of the physical environment data to the management system 312. In some embodiments, the physical environment management system 302 may provide the physical environment data to a physical environment data store. For example, the physical environment management system 302 may store the physical environment data in a physical environment data store with an identifier of the physical environment associated with the physical environment data. The management system 312 may obtain the physical environment data from the data store based on the identifier of the physical environment associated with the physical environment data. Therefore, the physical environment management system 302 may provide the physical environment data to the management system 312.

Based on receiving the physical environment data, at (3), the management system 312 provides the physical environment data to the simulation computing system 308 for generation of virtual replications of the physical environment. The management system 312 may provide the physical environment data obtained from the simulation computing system 308 or a subset of the physical environment data obtained from the simulation computing system 308 to the simulation computing system. Further, the management system 312 may provide the physical environment data with a request to generate virtual replications of the physical environment. Further, the management system 312 may indicate how the simulation computing system 308 is to generate the one or more replications of the physical environment based on the physical environment data. Therefore, the management system 312 may provide the physical environment data to the simulation computing system 308.

To identify modified versions of the physical environment, at (4), the simulation computing system 308 generates the one or more virtual replications of the physical environment. To generate the one or more virtual replications of the physical environment, the simulation computing system may provide input data to a simulation platform. In some embodiments, the input data may be a script for the generation of the one or more virtual replications of the physical environment. The input data may include one or more base inputs associated with the physical environment (or a plurality of physical environments). For example, the base inputs may include inputs or parameters (e.g., timing data that is associated with a plurality of physical environments). The input data may also include one or more customized inputs associated with the physical environment. The customized inputs may include the physical environment data. Based on the provided input data, the simulation computing system 308 can generate a virtual replication of the physical environment. Further, the simulation computing system 308 can modify one or more inputs or parameters of the input data to generate a modified virtual replication of the physical environment. The modified virtual replication of the physical environment may identify how the physical environment would operate if one or more parameters were changed. For example, the modified virtual replication of the physical environment may identify how operation of the physical environment would change if the physical environment layout were modified (e.g., an ordering option was removed). The simulation computing system 308 may generate a plurality of modified virtual replications of the physical environment. Therefore, the simulation computing system 308 can generate one or more virtual replications of the physical enviornment.

Based on the one or more virtual replications of the physical environment, at (5), the simulation computing system 308 provides virtual production data to the management system 312. The simulation computing system 308 may generate the one or more virtual replications of the physical environment and simulate the operation of the one or more virtual replications of the physical environment.

Based on the simulation of the operation of the one or more virtual replications, the simulation computing system may identify virtual production data associated with the one or more virtual replications. For example, each of the one or more virtual replications may produce virtual replication data identifying the operation of the corresponding virtual replication. In some embodiments, the simulation computing system 308 and/or the management system 312 may identify key performance indicators based on the virtual production data. For example, the key performance indicators may include a speed of service (e.g., per item, per physical environment, per queue length, etc.), a worker utilization and/or efficiency (e.g., per worker), a throughput (e.g., per machine, per station of the physical environment, etc.), etc. based on the virtual production data. Therefore, the simulation computing system 308 can provide the virtual production data to the management system 312.

Figure 4B:
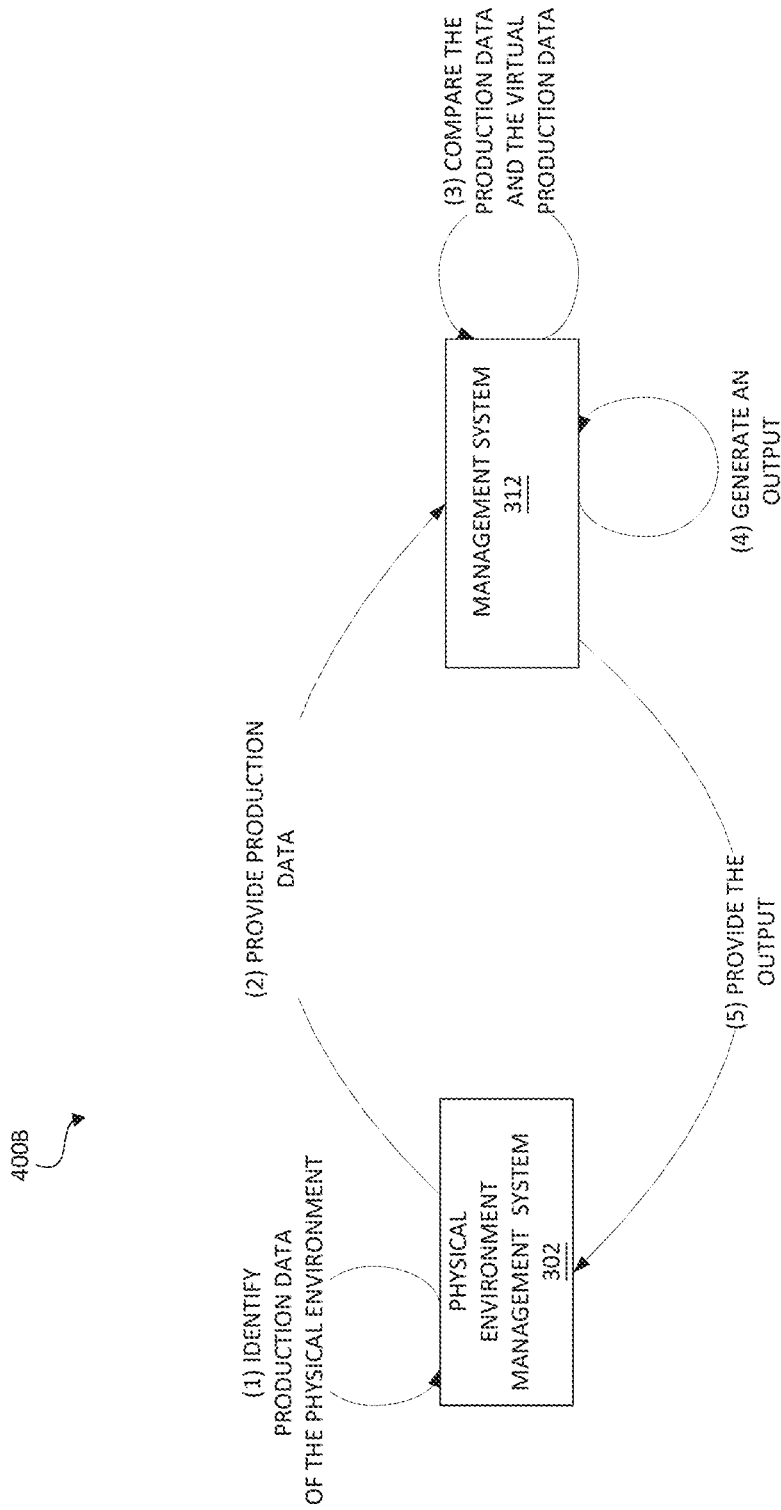

To further illustrate how the management system 312 can generate the virtual replications of the physical environment, FIG. 4B depicts illustrative interactions 400B for generating the virtual replications of the physical environment, including comparing production data and virtual production data. The interactions 400B of FIG. 4B may occur, for example, after a simulation computing system 308 has simulated the performance of one or more virtual replications of a physical environment to identify virtual production data. Further, the interactions 400B may occur after an initial configuration of the physical environment. In some embodiments, the interactions 400B may occur subsequent to the interactions 400A of FIG. 4A.

The interactions of FIG. 4B begin at (1), where a physical environment management system 302 identifies production data of the physical environment. The physical environment management system 302 may identify the production data based on a physical environment identifier associated with a particular physical environment (e.g., a physical environment identifier assigned and/or provided to the physical environment management system). The production data may identify a performance of the physical environment that may be based at least in part on the configuration of the physical environment identified by the physical environment. Further, the production data may identify how the physical environment is operating based on the physical environment data. For example, the physical environment management system 302 may analyze the production data to identify key performance indicators (e.g., a speed of service, worker utilization data, machine utilization data, efficiency, etc.). The physical environment management system 302 may receive the production data as the physical environment is operated. For example, the physical environment management system 302 may periodically or aperiodically receive production data identifying worker data, machine data, overall performance data, inventory data, etc. Further, one or more computing devices may periodically report the production data to the physical environment management system 302. The physical environment management system 302 may receive the production data as batch production data or as streaming production data (e.g., production data received in real time). As discussed above, the physical environment management system 302 may receive the production data from a user computing device, one or more sensors, and/or any other devices. Therefore, the physical environment management system 302 can identify the production data of the physical environment.

Based on identifying the production data, at (2), the physical environment management system 302 provides the production data to the management system 312. The physical environment management system 302 may parse the production data and provide a subset of the production data to the management system 312. The physical environment management system 302 may provide the production data to the management system 312 subsequent to, during, or after simulation of the virtual replications of the physical environment by the simulation computing system 308 to generate the virtual production data. In some embodiments, the physical environment management system 302 may provide the production data to a production data store. For example, the physical environment management system 302 may store the production data in a production data store with an identifier of the physical environment associated with the production data. The management system 312 may obtain the production data from the data store based on the identifier of the physical environment associated with the production data. Therefore, the physical environment management system 302 may provide the production data to the management system 312.

Based on receiving the production data from the physical environment management system 302 and the virtual production data from the simulation computing system 308, at (3), the management system 312 compares the production data and the virtual production data. The management system 312 may compare the production data and the virtual production data to identify a particular set of physical environment data (e.g., a particular physical environment configuration). For example, the management system 312 may compare the production data and the virtual production data to identify physical environment data associated with a highest speed of service, a highest worker utilization rate, a highest machine utilization rate, etc. Further, the comparison of the production data and the virtual production data may be based on one or more user goals. The one or more user goals may be associated with a user of the management system 312 and may indicate a preference or goal of the user. For example, the one or more user goals may identify a preference for increased speed of service, for increased worker utilization rate, for increased machine utilization rate, etc. Based on the one or more user goals, the management system 312 may compare specific components of the production data and the virtual production data. At a first time (e.g., during the afternoon), the user may be associated with a first user goal (e.g., increased throughput) and, at a second time (e.g., during the evening) the user may be associated with a second, different user goal (e.g., increased speed of service). In some embodiments, the management system 312 may compare the production data with a plurality of virtual production data associated with a plurality of virtual replications of the physical environment. Therefore, the management system 312 compares the production data and the virtual production data.

Based on the comparing the production data and the virtual production data, at (4), the management system 312 generates an output. The management system 312 may generate the output (or a plurality of the outputs) based at least in part on the comparison of the production data and the virtual production data and the user goals. For example, the management system 312 may generate an output based on determining whether the difference between the production data and the virtual production data exceeds a threshold (e.g., a user threshold, a system threshold, etc.) If the difference between the production data and the virtual production data exceeds the threshold, the management system 312 may generate an output that includes a modified virtual replication of the physical environment with a modified configuration of the physical environment based on physical environment data associated with the virtual production data. If the difference between the production data and the virtual production data does not exceed the threshold, the management system 312 may generate an output that includes a virtual replication of the physical environment with a current configuration of the physical environment (e.g., based on a user preference to maintain the current configuration of the physical environment). For example, the output may identify a modified configuration of the physical environment with discontinued ordering, discontinued products (e.g., americanos), initiation of in-environment dining, etc. based on the virtual replication of the physical environment associated with the modification. Further, the output may include a reordering of multiple received orders and/or an order with multiple products. For example, the physical environment may receive a first order for a first product, a second order for a second product and a third product, and a third order for a fourth product. The output may include a worker schedule to assign and start production of the first product, assign and complete production of the third product, assign and start production of the second product, assign and complete production of the fourth product, and complete production of the first and second products. Therefore, the management system 312 can generate the output.

Based on the output, at (6), the management system 312 provides the output for the user to the physical environment management system 302 associated with the user. Further, the physical environment management system 302 may route the output to a user computing device associated with the user.

In response to receiving the output, the user computing device may display the output. For example, the user computing device may display the output via an interface (e.g., an API, a CLI, or any other interface). Further, the user computing device may display the output via a web page, a mobile API, a voice interface, or any other interface for the user computing device.

Figure 5:
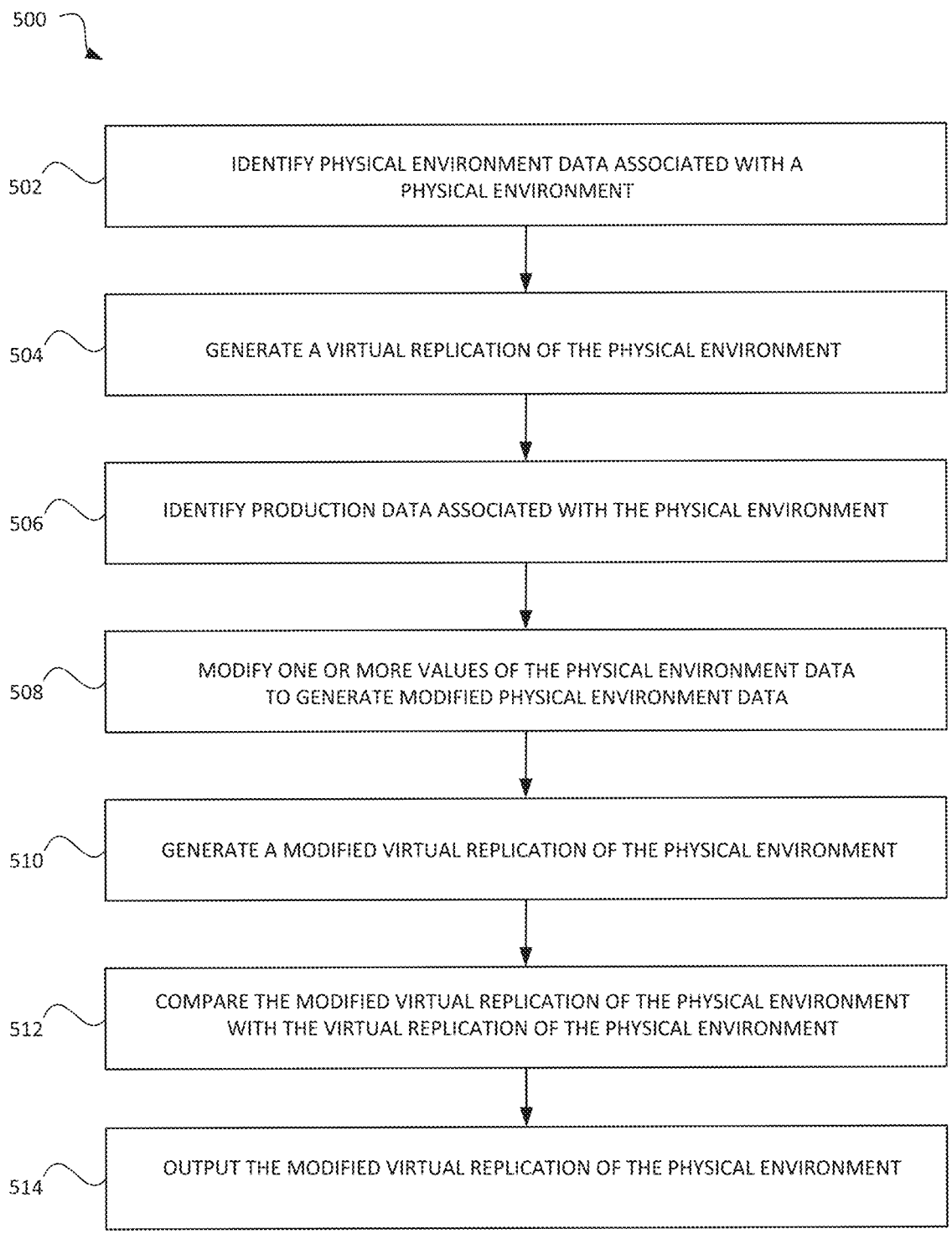
FIG. 5 illustrates a flow chart depicting an illustrative routine for generating the virtual replications of the physical environment and generating an output.

With reference to FIG. 5, an illustrative routine 500 will be described for generating virtual replications of the physical environment. The routine 500 may be implemented for example, by the management system 312 of FIG. 3. The routine 500 begins at block 502, the management system 312 identifies physical environment data associated with a physical environment. For example, the physical environment data may be associated with operation of the physical environment. In some cases, the management system 312 may identify a plurality of environment data associated with a physical environment (e.g., an area, an enclosure, a store, a building, an office, a factory, a business, etc.). The physical environment data may include at least one of inventory data, physical environment configuration data, labor allocation data, physical environment layout data, and/or machine allocation data (e.g., equipment allocation data). The labor allocation may identify one or more workers associated with the physical environment (e.g., robot workers or human workers).

At block 504, the management system 312 generates a virtual replication of the physical environment. For example, the virtual replication of the physical environment may be a virtual physical environment, a virtual model, etc. In some cases, the management system 312 may generate a virtual environment (e.g., a virtual store) modelling a physical environment (e.g., a store). The management system 312 may access a simulation platform to generate the virtual replication of the physical environment. The simulation platform may generate the virtual replication of the physical environment based on the plurality of physical environment data. To generate the virtual replication of the physical environment, the simulation platform may run a plurality of simulations and may compare an output of each of the plurality of simulations to verify the virtual replication.

At block 506, the management system 312 production data associated with the physical environment. The management system 312 may identify the production data based on the virtual replication of the physical environment. For example, the production data may include at least one of sensor data, machine data (e.g., equipment data), ordering data, inventory data, and/or order processing data. Further, the management system 312 may receive the production data from another computing system (e.g., the physical environment management system 302). For example, the management system 312 may obtain the production data, in real time, from one or more sensors. Further, the management system 312 may obtain the production data, in real time, from a physical environment computing system associated with the physical environment. The physical environment computing system may monitor a worker associated with the physical environment and identify worker utilization data associated with the worker based on monitoring the worker. Further, the production data may include the worker utilization data. The worker utilization data may identify a status of the worker at a particular time (e.g., active, idle, walking, etc.). Further, the physical environment computing system may monitor a machine (e.g., particular equipment) associated with the physical environment and identify machine utilization data associated with the machine based on monitoring the machine. The production data may include the machine utilization data. Based on the production data, the management system 312 may determine a speed of service, a throughput, and/or labor usage associated with the physical environment.

In some cases, the management system 312 may utilize the production data to test (e.g., in real time) the virtual replication of the physical environment. For example, the management system 312 may compare the production data associated with the physical environment with production data associated with the virtual replication of the physical environment to align a data stream associated with the physical environment with a data stream associated with the virtual replication of the physical environment. The management system 312 may compare the production data associated with the physical environment with production data associated with the virtual replication of the physical environment to confirm whether the virtual replication of the physical environment is modelling the physical environment. For example, the management system 312 may confirm whether the production data associated with the physical environment matches the production data associated with the virtual replication of the physical environment within a certain degree of accuracy (e.g., 90%, 95%, 97%, etc.). In some cases, the degree of accuracy may be system-generated or user-generated. If the management system 312 determines the production data associated with the physical environment does not match the production data associated with the virtual replication of the physical environment within the certain degree of accuracy, the management system 312 may adjust (e.g., in real time) one or more values associated with the virtual replication of the physical environment and retest the physical environment. For example, the management system 312 may modify one or more values associated with a particular sensor, a particular piece of equipment, the workers, etc. The management system 312 may repeat any number of iterations of adjusting and retesting the virtual replication of the physical environment.

At block 508, the management system 312 modifies one or more values of the physical environment data to generate modified physical environment data. The management system 312 may modify one or more values of the physical environment data to generate the modified physical environment data based on identifying the production data associated with the physical environment.

In some cases, the management system 312, a separate system, and/or a user (via a user computing device) may define modifiable values of the physical environment data. The management system 312, the separate system, and/or the user may indicate that values associated with one or more of a number of partners, a type of partners, a size of the physical environment, a number of equipment, a type of equipment, an amount of waste, a drive-thru, mobile ordering, etc. are modifiable or are not modifiable. For example, the user may indicate that values associated with a number of equipment, a type of equipment, a drive-thru, and mobile ordering are modifiable, and values associated with number of partners, a type of partners, a size of the physical environment, and an amount of waste are not modifiable. Further, the management system 312, the separate system, and/or the user may provide value parameters (e.g., a range, a maximum, a minimum, an average, a mean, etc.) for one or more values. For example, a user may indicate that a value associated with a number of workers may not be modified to be over 30 workers. The management system 312 may generate the modified physical environment data based on the modifiable values and/or the parameters.

At block 510, the management system 312 generates a modified virtual replication of the physical environment. The management system 312 may access the simulation platform to generate the modified virtual replication of the physical environment. The simulation platform may generate the modified virtual replication physical environment based on the modified physical environment data. As discussed above, to generate the modified virtual replication of the physical environment, the simulation platform may run a plurality of simulations and may compare an output of each of the plurality of simulations to verify the modified virtual replication. Further, the simulation platform may map a plurality of sets of physical environment data including the physical environment data to a plurality of sets of virtual production data including the production data in order to determine how to simulate the modified virtual replication.

Based on the virtual replication and the modified virtual replication, at block 512, the management system 312 compares the modified virtual replication of the physical environment with the virtual replication of the physical environment. The comparison of the modified virtual replication of the physical environment and the virtual replication of the physical environment may be based on the production data. Further, to compare the modified virtual replication of the physical environment and the virtual replication of the physical environment, the management system 312 may compare production data associated with the modified virtual replication with the production data associated with the physical environment. In some embodiments, the management system 312 may compare a plurality of modified virtual replications of the physical environment (including the modified virtual replication of the physical environment) with the virtual replication of physical environment based on the plurality of production data. Further, the management system 312 may further determine one or more user goals and the user goals may correspond to one or more speed of service, throughout, and/or labor usage. The comparison of the modified virtual replication and the virtual replication may be based on the one or more user goals. In some embodiments, each of the user goals may be associated with particular conditions and comparison of the modified virtual replication with the virtual replication may be based on the particular conditions.

In order to determine a physical environment configuration for the physical environment, at block 514, the management system 312 outputs the modified virtual replication of the physical environment. The output of the modified virtual replication of the physical environment may be based on comparing the modified virtual replication of the physical environment with the virtual replication of the physical environment. In some embodiments, the output of the modified virtual replication of the physical environment may be based on comparing a plurality of modified virtual replications with the virtual replication. The output may include data associated with the modified virtual replication of the physical environment. For example, the output may include a modified physical environment layout associated with the physical environment, a modified worker allocation associated with the physical environment, or a modified machine (e.g., equipment) allocation associated with the physical environment. Further, the output may include a worker schedule and a scheduling system may dynamically define the worker schedule.

In some embodiments, the management system 312 may cause display of the output. The management system 312 may cause display of the output via a display of a user computing device associated with a user.

The management system 312 may output the modified virtual replication of the physical environment as a recommendation for the user (e.g., a recommended layout of the physical environment). In some cases, to generate the recommendation, the management system 312 may compare the modified virtual replication of the physical environment and the virtual replication of the physical environment based on cost to implement the recommendation, savings based on implementing the recommendation, productivity based on implementing the recommendation, etc. For example, the management system 312 may recommend the modified virtual replication of the physical environment based on determining that the savings based on implementing the recommendation exceed the cost to implement the recommendation by a particular amount (e.g., 10%, 20%, etc.).

In some cases, the management system 312 may identify a subset of production data associated with one or more sensors of the physical environment. For example, the management system 312 may identify a first subset of the production data associated with a motion sensor associated with a drive-thru window, a second subset of the production data associated with a proximity sensor associated with a register, a third subset of the production data associated with a sensor associated with an espresso machine, etc. The management system 312 may identify the subsets of the production data based on a manner of parsing the production data. For example, a user (via a user computing device) may identify a manner of parsing the production data to identify a subset of the production data associated with a particular sensor. In some cases, a user may periodically or aperiodically update a manner of parsing the production data. For example, a user may add a sensor to the physical environment and define a manner of parsing the production data to identify a subset of the production data associated with the sensor and/or a user may update and/or add a manner of parsing the production data to identify a subset of the production data associated with a previously added sensor.

Further, the management system 312 may define a virtual sensor in the virtual replication of the physical environment corresponding to the sensor. The management system 312 may define a subset of the virtual production data associated with the virtual replication of the physical environment. Based on the subset of the virtual production data and the subset of the production data, the management system 312 may compare the physical environment and the virtual replication of the physical environment. As the management system 312 may dynamically identify and/or define a subset of data associated with a particular sensor, the management system 312 can dynamically adjust the granularity of the comparison of the physical environment and the virtual replication of the physical environment. This can enable the management system 312 to correlate the virtual replication of the physical environment to the physical environment on a dynamic granular level (e.g., based on individual sensors associated with the physical environment). In some cases, the management system 312 may tune the virtual replication of the physical environment and/or a particular virtual sensor of the virtual replication of the physical environment based on comparing the physical environment and the virtual replication of the physical environment using the subset of the virtual production data and the subset of the production data. In other cases, the management system 312 may replace the virtual replication of the physical environment based on comparing the physical environment and the virtual replication of the physical environment using the subset of the virtual production data and the subset of the production data. Further, the management system 312 can utilize the defined subset of the virtual production data to compare the modified virtual replication of the physical environment with the virtual replication of the physical environment (e.g., using the subset of the virtual production data and a subset of the modified virtual production data).

In various embodiments, the execution routine 500 may include more, fewer, different, or different combinations of blocks than those depicted in FIG. 5. For example, the routine 500 may include, in some embodiments, display of the virtual replication. As a further example, blocks 504 and 508 may be combined, and the routine 500 may access the simulation platform to generate the virtual replication and the modified virtual replications simultaneously. The routine 500 depicted in FIG. 5 is thus understood to be illustrative and not limiting.

Computer Systems

Figure 6:
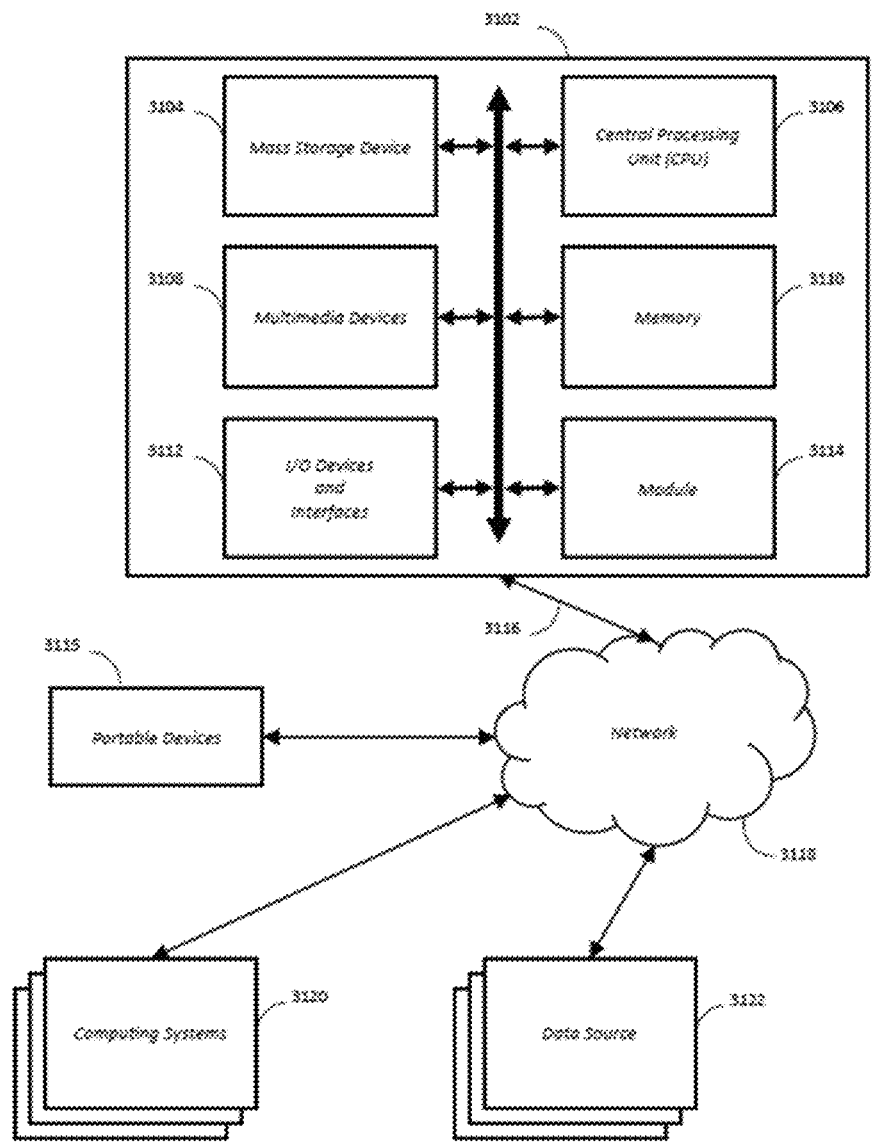
FIG. 6 illustrates a block diagram illustrating an embodiment of a computer hardware system configured to run software for implementing one or more embodiments of the system, methods, and devices disclosed herein.

FIG. 6 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 6. The example computer system 3102 is in communication with one or more computing systems 3120 and/or one or more data sources 3122 via one or more networks 3118. While FIG. 6 illustrates an embodiment of a computer system 3102, it is recognized that the functionality provided for in the components and modules of computer system 3102 may be combined into fewer components and modules, or further separated into additional components and modules.

The computer system 3102 can comprise a module 3114 that carries out the functions, methods, acts, and/or processes described herein. The module 3114 is executed on the computer system 3102 by a central processing unit 3106 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 3102 includes one or more processing units (CPU) 3106, which may comprise a microprocessor. The computer system 3102 further includes a physical memory 3110, such as random-access memory (RAM) for temporary storage of information, a read only memory (ROM) for permanent storage of information, and a mass storage device 3104, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 3102 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 3102 includes one or more input/output (I/O) devices and interfaces 3112, such as a keyboard, mouse, touch pad, and printer. The I/O devices and interfaces 3112 can include one or more display devices, such as a monitor, that allows the visual presentation of data to a user. More particularly, a display device provides for the presentation of GUIs as application software data, and multi-media presentations, for example. The I/O devices and interfaces 3112 can also provide a communications interface to various external devices. The computer system 3102 may comprise one or more multi-media devices 3108, such as speakers, video cards, graphics accelerators, and microphones, for example.

The computer system 3102 may run on a variety of computing devices, such as a server, a Windows server, a Structure Query Language server, a Unix Server, a personal computer, a laptop computer, and so forth. In other embodiments, the computer system 3102 may run on a cluster computer system, a mainframe computer system and/or other computing system suitable for controlling and/or communicating with large databases, performing high volume transaction processing, and generating reports from large databases. The computer system 3102 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 3102 illustrated in FIG. 6 is coupled to a network 3118, such as a LAN, WAN, or the Internet via a communication link 3116 (wired, wireless, or a combination thereof). Network 3118 communicates with various computing devices and/or other electronic devices. Network 3118 is communicating with one or more computing systems 3120 and one or more data sources 3122. The module 3114 may access or may be accessed by computing systems 3120 and/or data sources 3122 through a web-enabled user access point. Connections may be a direct physical connection, a virtual connection, and other connection type. The web-enabled user access point may comprise a browser module that uses text, graphics, audio, video, and other media to present data and to allow interaction with data via the network 3118.

Access to the module 3114 of the computer system 3102 by computing systems 3120 and/or by data sources 3122 may be through a web-enabled user access point such as the computing systems' 3120 or data source's 3122 personal computer, cellular phone, smartphone, laptop, tablet computer, e-reader device, audio player, or another device capable of connecting to the network 3118. Such a device may have a browser module that is implemented as a module that uses text, graphics, audio, video, and other media to present data and to allow interaction with data via the network 3118.

The output module may be implemented as a combination of an all-points addressable display such as a cathode ray tube (CRT), a liquid crystal display (LCD), a plasma display, or other types and/or combinations of displays. The output module may be implemented to communicate with input devices 3112 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the computer system 3102 may comprise a physical or logical connection established between a remote microprocessor and a mainframe host computer for the express purpose of uploading, downloading, or viewing interactive data and databases on-line in real time. The remote microprocessor may be operated by an entity operating the computer system 3102, including the client server systems or the main server system, an/or may be operated by one or more of the data sources 3122 and/or one or more of the computing systems 3120. In some embodiments, terminal emulation software may be used on the microprocessor for participating in the micro-mainframe link.

In some embodiments, computing systems 3120 who are internal to an entity operating the computer system 3102 may access the module 3114 internally as an application or process run by the CPU 3106.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computer system 3102 may include one or more internal and/or external data sources (for example, data sources 3122). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 3102 may also access one or more databases 3122. The databases 3122 may be stored in a database or data repository. The computer system 3102 may access the one or more databases 3122 through a network 3118 or may directly access the database or data repository through I/O devices and interfaces 3112. The data repository storing the one or more databases 3122 may reside within the computer system 3102.

ADDITIONAL EMBODIMENTS

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A system comprising:
    a first hardware device located at a first physical location within a physical environment, and configured to physically output labels comprising a machine readable code, wherein the machine readable code is associated with an object, wherein the physical environment comprises:
        a first physical route through the physical environment, the first physical route comprising a first route start, a first route end, and one or more first physical machines between the first route start and the first route end, and
        a second physical route through the physical environment, the second physical route comprising a second route start, a second route end, and one or more second physical machines between the second route start and the second route end;
    a second hardware device associated with the first physical route, the second hardware device located at a second physical location within the physical environment, and configured to optically scan the machine readable code using a first image sensor;
    a third hardware device associated with the second physical route, the third hardware device located at a third physical location within the physical environment, and configured to optically scan the machine readable code using a second image sensor; and a controller comprising:
  a memory configured to store computer-executable instructions; and
  at least one processor in communication with the memory, wherein the computer-executable instructions, when executed by the at least one processor, cause the at least one processor to:
    receive first object data associated with an object;
    instruct the first hardware device to output a label comprising the machine readable code based at least in part on the first object data;
    receive, from the first hardware device, first time data, wherein the first time data indicates an output time of the label by the first hardware device;
    receive, from the second hardware device, first production data, a second hardware device identifier, and second object data, wherein the first production data indicates 1) that the second hardware device scanned the machine readable code and 2) a scan time of the machine readable code by the second hardware device, and wherein the second hardware device identifier indicates the second physical location;
    determine, based at least in part on the first production data, the second hardware device identifier, and the second object data, input data, wherein the input data indicates that the object was produced via the first physical route, and a production time associated with the object, wherein the production time is based at least in part on the output time of the label and the scan time;
    execute a machine learning model based at least in part on the input data, wherein the machine learning model predicts performance data associated with the one or more first physical machines based at least in part on the input data; and
    instruct execution of a physical machine according to the performance data.

2. The system of claim 1, wherein to instruct execution of the physical machine, the computer-executable instructions, when executed by the at least one processor, further cause the at least one processor to:
  generate at least one of a layout or a schedule based at least in part on the performance data; and
  instruct the physical machine to output the at least one of the layout or the schedule.

3. The system of claim 1, wherein to instruct execution of the physical machine, the computer-executable instructions, when executed by the at least one processor, further cause the at least one processor to instruct the one or more first physical machines to automatically perform one or more operations in a particular order.

4. The system of claim 1, wherein the computer-executable instructions, when executed by the at least one processor, further cause the at least one processor to instruct execution of the one or more second physical machines according to the performance data.

5. The system of claim 1, wherein the one or more first physical machines comprises:
  a coffee maker;
  an oven;
  an object component indication system;
  a distribution device; or
  a production system.

6. The system of claim 1, wherein the computer-executable instructions, when executed by the at least one processor, further cause the at least one processor to:
  train the machine learning model using training data to obtain a trained machine learning model, wherein to execute the machine learning model, the computer-executable instructions, when executed by the at least one processor, further cause the at least one processor to execute the trained machine learning model.

7. The system of claim 1, wherein the performance data comprises a production schedule.

8. The system of claim 1, wherein the performance data comprises a layout of the one or more first physical machines.

9. The system of claim 1, wherein the second physical location is the first route end.

10. The system of claim 9, wherein the first route start is a work center, and the first route end is a distribution point.

11. The system of claim 10, wherein the distribution point is one of a pick-up counter and a drive-thru counter.

12. The system of claim 1, wherein the computer-executable instructions, when executed by the at least one processor, further cause the at least one processor to receive the first production data from the one or more first physical machines.

13. The system of claim 1, wherein the first physical route comprises one or more intermediate production stages, wherein the first route start and each of the one or more intermediate production stages comprise a work center, and at least one of the one or more intermediate production stages comprise a hardware device.

14. The system of claim 1, wherein the computer-executable instructions, when executed by the at least one processor, further cause the at least one processor to:
  receive third object data associated with a second object;
  instruct the first hardware device to output a second label comprising a second machine readable code associated with the second object based at least in part on the third object data;
  receive, from the first hardware device, second time data, wherein the second time data indicates a second output time of the second label by the first hardware device;
  receive, from the third hardware device, second production data, a third hardware device identifier, and fourth object data, wherein the second production data indicates 1) that the third hardware device scanned the second machine readable code, and 2) a second scan time of the second machine readable code by the third hardware device, and wherein the third hardware device identifier indicates the third physical location; and
  determine, based at least in part on the second production data, the third hardware device identifier, and the fourth object data, second input data, wherein the second input data indicates that the second object was produced via the second physical route, and a second production time associated with the second object, wherein the second production time is based at least in part on the second output time of the second label and the second scan time.

15. The system of claim 1, wherein the physical environment further comprises a third physical route, the third physical route comprising a third route start, a third route end, and one or more third physical machines between the third route start and the third route end wherein the third route start is the first route start, the third route end is the second route end, and the first route end is the second route start such that the first physical route and the second physical route are intermediate production stages of the third physical route.

16. The system of claim 15, wherein the computer-executable instructions, when executed by the at least one processor, further cause the at least one processor to:
receive, from the third hardware device, second production data, a third hardware device identifier, and the second object data, wherein the second production data indicates 1) that the third hardware device scanned the machine readable code, and 2) a second scan time of the machine readable code by the third hardware device, and wherein the third hardware device identifier indicates the third physical location;
determine, based at least in part on the second production data, the third hardware device identifier, and the second object data, second input data, wherein the second input data indicates that the object was produced via the second physical route, a second production time associated with the object, wherein the second production time is based at least in part on the scan time and the second scan time; and
determine, based at least in part on the production time and the second production time, a third production time.

17. A system comprising:
a printer located at a first physical location within a physical environment, the printer configured to print labels comprising a machine readable code, wherein the machine readable code is associated with an item, wherein the physical environment comprises a route, the route comprising one or more machines;
a scanner associated with the route, the scanner located at a second physical location within the physical environment, and configured to scan the machine readable code; and
a production controller comprising:
a memory configured to store computer-executable instructions; and
at least one processor in communication with the memory, wherein the computer-executable instructions, when executed by the at least one processor, cause the at least one processor to:
receive object data associated with the item;
instruct the printer to print a label comprising a machine readable code based at least in part on the object data;
receive, from the printer, first time data, wherein the first time data indicates a printing time of the label by the printer;
receive, from the scanner, production data, a scanner identifier, and item information, wherein the production data indicates 1) that the scanner scanned the machine readable code, and 2) a scanning time of the machine readable code by the scanner;
determine, based at least in part on the production data, the scanner identifier, and the item information, input data, wherein the input data indicates that the item was produced via the route, and a production time associated with the item, wherein the production time is based at least in part on the printing time and the scanning time;
determine performance data associated with the one or more machines based at least in part on the input data; and
instruct execution of a machine according to the performance data.

18. The system of claim 17, wherein to instruct execution of the machine, the computer-executable instructions, when executed by the at least one processor, further cause the at least one processor to:
generate at least one of a layout or a schedule based at least in part on the performance data; and
instruct the machine to output the at least one of the layout or the schedule.

19. The system of claim 17, wherein to instruct execution of the machine, the computer-executable instructions, when executed by the at least one processor, further cause the at least one processor to instruct the one or more machines to automatically perform one or more operations in a particular order.

20. A computer-implemented method comprising:
receiving first object data associated with an object;
instructing a first hardware device located at a first physical location within a physical environment to physically output a label comprising machine readable code based at least in part on the first object data, wherein the machine readable code is associated with the object;
receiving, from the first hardware device, first time data, wherein the first time data indicates an output time of the label by the first hardware device;
receiving, from a second hardware device associated with a first physical route through the physical environment and located at a second physical location within the physical environment, first production data, a second hardware device identifier, and second object data, wherein the second hardware device is configured to optically scan the machine readable code using a first image sensor, wherein the first physical route comprises a first route start, a first route end, and one or more first physical machines between the first route start and the first route end, wherein the first production data indicates 1) that the second hardware device scanned the machine readable code and 2) a scan time of the machine readable code by the second hardware device, and wherein the second hardware device identifier indicates the second physical location, wherein a third hardware device is associated with a second physical route through the physical environment and is located at a third physical location within the physical environment, the second physical route comprising a second route start, a second route end, and one or more second physical machines between the second route start and the second route end, wherein the third hardware device is configured to optically scan the machine readable code using a second image sensor;
determining, based at least in part on the first production data, the second hardware device identifier, and the second object data, input data, wherein the input data indicates that the object was produced via the first physical route, and a production time associated with the object, wherein the production time is based at least in part on the output time of the label and the scan time;
executing a machine learning model based at least in part on the input data, wherein the machine learning model predicts performance data associated with the one or more first physical machines based at least in part on the input data; and
instructing execution of a physical machine according to the performance data.

* * * * *